(12) United States Patent
Murrow

(10) Patent No.: US 10,710,735 B2
(45) Date of Patent: Jul. 14, 2020

(54) OPERATION OF A VERTICAL TAKEOFF AND LANDING AIRCRAFT

(71) Applicant: General Electric Company, Schenectady, NY (US)

(72) Inventor: Kurt David Murrow, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/042,439

(22) Filed: Jul. 23, 2018

(65) Prior Publication Data

US 2019/0061964 A1 Feb. 28, 2019

Related U.S. Application Data

(60) Provisional application No. 62/535,444, filed on Jul. 21, 2017.

(51) Int. Cl.
| | | |
|---|---|---|
| *B64D 27/24* | (2006.01) | |
| *B64C 29/00* | (2006.01) | |
| *B64D 29/04* | (2006.01) | |
| *B64C 3/32* | (2006.01) | |
| *B64C 11/30* | (2006.01) | |
| *B64C 27/26* | (2006.01) | |

(Continued)

(52) U.S. Cl.
CPC ............... *B64D 27/24* (2013.01); *B64C 3/32* (2013.01); *B64C 3/38* (2013.01); *B64C 29/0025* (2013.01); *B64D 27/08* (2013.01); *B64D 29/04* (2013.01); *B64D 31/06* (2013.01); *B64D 33/04* (2013.01); *B64D 35/02* (2013.01); *B64D 27/02* (2013.01); *B64D 27/26* (2013.01); *B64D 2027/026* (2013.01); *F05D 2220/76* (2013.01); *F05D 2270/093* (2013.01); *H02K 7/1823* (2013.01)

(58) Field of Classification Search
CPC .. B64D 27/24; B64D 2027/026; B64D 27/26; B64D 27/02; B64D 29/04; B64D 27/10; B64D 31/06; B64D 33/04; B64D 27/04; B64D 35/02; B64D 27/08; F02C 7/36; H02K 7/1823; F05D 2270/093; F05D 2220/76; B64C 29/00; B64C 27/32; B64C 27/20; B64C 3/00; B64C 29/0058; B64C 3/10; B64C 11/46; B64C 3/38; B64C 29/0025; B64C 27/26; B64C 11/30; B64C 3/32
USPC ......... 60/698, 706, 709, 716, 718; 244/12.4, 244/12.5, 62
See application file for complete search history.

(56) References Cited

U.S. PATENT DOCUMENTS

| 3,128,970 A | 4/1964 | Tinajero et al. |
| 3,161,374 A | 12/1964 | Allred et al. |

(Continued)

*Primary Examiner* — Hoang M Nguyen
(74) *Attorney, Agent, or Firm* — Dority & Manning, P.A.

(57) ABSTRACT

A method is provided for operating a propulsion system of a vertical takeoff and landing aircraft, the propulsion system including a turbomachine, an electric machine, a forward thrust propulsor, and a plurality of vertical thrust electric fans. The method includes driving the forward thrust propulsor with the turbomachine; rotating the electric machine with the turbomachine to generate electrical power; determining a failure condition of the turbomachine; and providing electrical power to the electric machine to drive the forward thrust propulsor with the electric machine in response to determining the failure condition of the turbomachine.

20 Claims, 10 Drawing Sheets

(51) Int. Cl.

| | | |
|---|---|---|
| *B64D 27/08* | (2006.01) | |
| *B64D 35/02* | (2006.01) | |
| *B64C 3/38* | (2006.01) | |
| *B64C 11/46* | (2006.01) | |
| *B64C 3/10* | (2006.01) | |
| *B64D 27/04* | (2006.01) | |
| *B64D 33/04* | (2006.01) | |
| *B64D 31/06* | (2006.01) | |
| *F02C 7/36* | (2006.01) | |
| *B64D 27/02* | (2006.01) | |
| *B64D 27/26* | (2006.01) | |
| *H02K 7/18* | (2006.01) | |

(56) References Cited

U.S. PATENT DOCUMENTS

| | | |
|---|---|---|
| 3,206,929 A | 9/1965 | Marchant et al. |
| 3,212,731 A | 10/1965 | Kappus |
| 3,220,669 A | 11/1965 | Lewis et al. |
| 3,388,878 A | 6/1968 | Peterson et al. |
| 3,499,620 A | 3/1970 | Haberkorn et al. |
| 3,618,875 A | 11/1971 | Kappus |
| 3,762,667 A | 10/1973 | Pender |
| 4,469,294 A | 9/1984 | Clifton |
| 4,789,115 A | 12/1988 | Koutsoupidis |
| 4,828,203 A | 5/1989 | Clifton et al. |
| 5,054,716 A | 10/1991 | Wilson |
| 5,141,176 A | 8/1992 | Kress et al. |
| 5,209,428 A | 5/1993 | Bevilaqua et al. |
| 5,312,069 A | 5/1994 | Bollinger et al. |
| 5,320,305 A | 6/1994 | Oatway et al. |
| 5,542,625 A | 8/1996 | Burhans, Jr. et al. |
| 5,758,844 A | 6/1998 | Cummings |
| 5,765,777 A | 6/1998 | Schmittle |
| 5,769,317 A | 6/1998 | Sokhey et al. |
| 6,036,142 A | 3/2000 | Yates |
| 6,270,037 B1 | 8/2001 | Freese et al. |
| 6,729,575 B2 | 5/2004 | Bevilaqua |
| 6,860,449 B1 | 3/2005 | Chen |
| 6,892,980 B2 | 5/2005 | Kawai |
| 7,104,499 B1 | 9/2006 | Arata |
| 7,114,685 B1 | 10/2006 | Schulein |
| 7,249,734 B2 | 7/2007 | Yurkovich |
| 7,410,122 B2 | 8/2008 | Robbins et al. |
| 7,412,825 B2 | 8/2008 | Muylaert |
| 7,665,689 B2 | 2/2010 | McComb |
| 7,735,774 B2 | 6/2010 | Lugg |
| 7,806,362 B2 | 10/2010 | Yoeli |
| 7,857,253 B2 | 12/2010 | Yoeli |
| 7,857,254 B2 | 12/2010 | Parks |
| 7,866,598 B2 | 1/2011 | Waide et al. |
| 8,016,226 B1 | 9/2011 | Wood |
| 8,128,019 B2 | 3/2012 | Annati et al. |
| 8,336,806 B2 | 12/2012 | Dierksmeier |
| 8,408,490 B2 | 4/2013 | McDonnell |
| 8,549,833 B2 * | 10/2013 | Hyde .................. F02C 6/00 60/204 |
| 8,622,335 B2 | 1/2014 | Yoeli |
| 8,757,538 B2 | 6/2014 | Siefert |
| 8,915,467 B2 | 12/2014 | Narasimha et al. |
| 9,010,693 B1 | 4/2015 | Barbieri |
| 9,085,355 B2 | 7/2015 | DeLorean |
| 9,132,915 B2 | 9/2015 | Zhu |
| 9,227,721 B1 | 1/2016 | Nguyen |
| 9,278,753 B2 | 3/2016 | Reckzeh et al. |
| 9,327,822 B1 | 5/2016 | Melton et al. |
| 9,481,457 B2 | 11/2016 | Alber |
| 9,676,479 B2 | 6/2017 | Brody et al. |
| 9,682,774 B2 | 6/2017 | Paduano et al. |
| 9,731,818 B2 | 8/2017 | Dekel et al. |
| 10,006,375 B1 * | 6/2018 | Wagner .................. F02C 9/46 |
| 2003/0080242 A1 | 5/2003 | Kawai |
| 2005/0133662 A1 | 6/2005 | Magre |
| 2012/0091257 A1 | 4/2012 | Wolff et al. |
| 2012/0280091 A1 * | 11/2012 | Saiz .................. B64C 27/26 244/7 R |
| 2014/0060004 A1 | 3/2014 | Mast et al. |
| 2014/0345281 A1 * | 11/2014 | Galbraith .................. B60K 6/24 60/716 |
| 2014/0367510 A1 * | 12/2014 | Viala .................. B64D 27/24 244/62 |
| 2015/0144742 A1 * | 5/2015 | Moxon .................. B64D 27/12 244/215 |
| 2015/0274289 A1 | 10/2015 | Newman et al. |
| 2015/0314865 A1 | 11/2015 | Bermond et al. |
| 2016/0167780 A1 | 6/2016 | Giovenga |
| 2016/0214710 A1 | 7/2016 | Brody et al. |
| 2016/0333822 A1 | 11/2016 | Roberts |
| 2016/0347447 A1 | 12/2016 | Judas et al. |
| 2017/0057631 A1 | 3/2017 | Fredericks et al. |
| 2017/0121029 A1 | 5/2017 | Blyth et al. |
| 2017/0159674 A1 | 6/2017 | Maciolek |
| 2017/0197709 A1 | 7/2017 | Fink et al. |
| 2017/0197711 A1 | 7/2017 | King et al. |
| 2017/0203839 A1 | 7/2017 | Giannini et al. |
| 2017/0234447 A1 | 8/2017 | Jennings et al. |
| 2017/0240274 A1 | 8/2017 | Regev |
| 2017/0327219 A1 | 11/2017 | Alber |

\* cited by examiner

OPERATION OF A VERTICAL TAKEOFF AND LANDING AIRCRAFT

RELATED APPLICATION

The present application is based upon and claims priority to U.S. Provisional Patent Application Ser. No. 62/535,444, filed on Jul. 21, 2017.

FIELD

The present subject matter relates generally to a method of operating a propulsion system for an aircraft having vertical takeoff and landing capabilities in the event of a failure condition.

BACKGROUND

Aircraft have been developed with a capability for performing vertical takeoff and landings. Such a capability may allow for the aircraft to reach relatively rugged terrains and remote locations, where it may be impractical or infeasible to construct a runway large enough to allow for a traditional aircraft (lacking vertical takeoff capability) to takeoff or land.

Typically these aircraft capable of performing vertical takeoff and landings have engines and propulsors that are vectored to generate both vertical thrust and forward thrust. However, the design characteristics that make a propulsor efficient for vertical takeoff and landing may not result in efficient forward flight. Accordingly, existing aircraft capable of performing vertical takeoff and landing include propulsors that may be well suited for generating vertical thrust, but that may not be very well suited for efficient forward flight. This discrepancy between vertical takeoff and landing and cruise efficiency is exaggerated as cruise speed increases. An aircraft capable of more efficiently performing a vertical takeoff and landing combined with high speed cruise would therefore be useful.

It will further be appreciated that certain vertical takeoff and landing aircraft may not include the same amount of redundancy as fixed wing aircraft for certain operations, such as forward flight operations. Accordingly, a vertical takeoff and landing aircraft that is able to continue operations in the event of a failure condition would be particularly useful.

BRIEF DESCRIPTION

Aspects and advantages of the invention will be set forth in part in the following description, or may be obvious from the description, or may be learned through practice of the invention.

In one aspect of the present disclosure a method is provided for operating a propulsion system of a vertical takeoff and landing aircraft, the propulsion system including a turbomachine, an electric machine, a forward thrust propulsor, and a plurality of vertical thrust electric fans. The method includes driving the forward thrust propulsor with the turbomachine; rotating the electric machine with the turbomachine to generate electrical power; determining a failure condition of the turbomachine; and providing electrical power to the electric machine to drive the forward thrust propulsor with the electric machine in response to determining the failure condition of the turbomachine.

In certain exemplary aspects the method further includes driving the plurality of vertical thrust electric fans at least in part with the electric power generated from rotating the electric machine with the turbomachine.

In certain exemplary aspects driving the forward thrust propulsor with the turbomachine includes driving the forward thrust propulsor with the turbomachine through a mechanical connection.

For example, in certain exemplary aspects the turbomachine is mechanically coupled to the forward thrust propulsor across the electric machine.

For example, in certain exemplary aspects the method further includes decoupling the turbomachine from the electric machine in response to determining the failure condition of the turbomachine.

For example, in certain exemplary aspects the method further includes reducing an effective gear ratio between the turbomachine and the electric machine in response to determining the failure condition of the turbomachine.

For example, in certain exemplary aspects providing electrical power to the electric machine to drive the forward thrust propulsor includes driving one or more components of the turbomachine with the electric machine.

In certain exemplary aspects rotating the electric machine with the turbomachine to generate electrical power includes generating alternating current electrical power and converting the alternating current electrical power generated to direct current electrical power.

For example, in certain exemplary aspects rotating the electric machine with the turbomachine to generate electrical power further includes providing at least one of an electric energy storage unit or the plurality of vertical thrust electric fans with direct current electric power.

For example, in certain exemplary aspects providing electrical power to the electric machine to drive the forward thrust propulsor includes receiving direct current electrical power, converting the direct current electrical power to alternating current electrical power, and providing the direct current electrical power converted to alternating current electric power to the electric machine to drive the forward thrust propulsor.

In certain exemplary aspects the propulsion system further includes an electric energy storage unit, and wherein providing electrical power to the electric machine to drive the forward thrust propulsor with the electric machine includes providing electrical power to the electric machine from the electric energy storage unit.

In certain exemplary aspects the propulsion system further includes an electric energy storage unit, and wherein rotating the electric machine with the turbomachine to generate electrical power includes charging the electric energy storage unit with the electric power generated.

In certain exemplary aspects the plurality of vertical thrust electric fans are fixed in position to provide thrust substantially along a vertical direction.

In certain exemplary aspects the forward thrust propulsor is mounted to a fuselage of the aircraft at an aft end of the aircraft.

In certain exemplary aspects the failure condition of the turbomachine is at least one of a shaft failure or a rotor failure of the turbomachine.

In another exemplary embodiment of the present disclosure, a hybrid-electric propulsion system is for an aircraft is provided. The system includes a power source including a combustion engine, an electric machine, and an electric energy storage unit, the electric energy storage unit electrically coupled to the electric machine; a plurality of vertical thrust electric fans driven by the power source and configured to be integrated into a wing of the aircraft in an orientation to generate thrust along a vertical direction of the aircraft; a forward thrust propulsor selectively or permanently mechanically coupled to the combustion engine; and a controller having a memory and one or more processors, the memory storing instructions that when executed by the one or more processors cause the hybrid-electric propulsion system to perform functions. The functions include driving the forward thrust propulsor with the combustion engine; rotating the electric machine with the combustion engine to generate electrical power; determining a failure condition of the combustion engine; and providing electrical power to the electric machine to drive the forward thrust propulsor with the electric machine in response to determining the failure condition of the combustion engine.

In certain exemplary embodiments the combustion engine is a turboshaft engine including an output shaft, wherein the forward thrust propulsor includes a fan shaft, and wherein the output shaft is selectively or permanently mechanically coupled to the fan shaft.

In certain exemplary embodiments driving the forward thrust propulsor with the turbomachine includes driving the forward thrust propulsor with the turbomachine through a mechanical connection.

For example, in certain exemplary embodiments the propulsion system further includes a coupling unit with the combustion engine selectively coupled to the electric machine through the coupling unit, and wherein the functions further includes: decoupling the turbomachine from the electric machine using the coupling unit in response to determining the failure condition of the turbomachine.

For example, in certain exemplary embodiments the propulsion system further includes a speed change mechanism with the combustion engine coupled to the electric machine through the speed change mechanism, and wherein the functions further includes: reducing an effective gear ratio between the turbomachine and the electric machine using the speed change mechanism in response to determining the failure condition of the turbomachine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
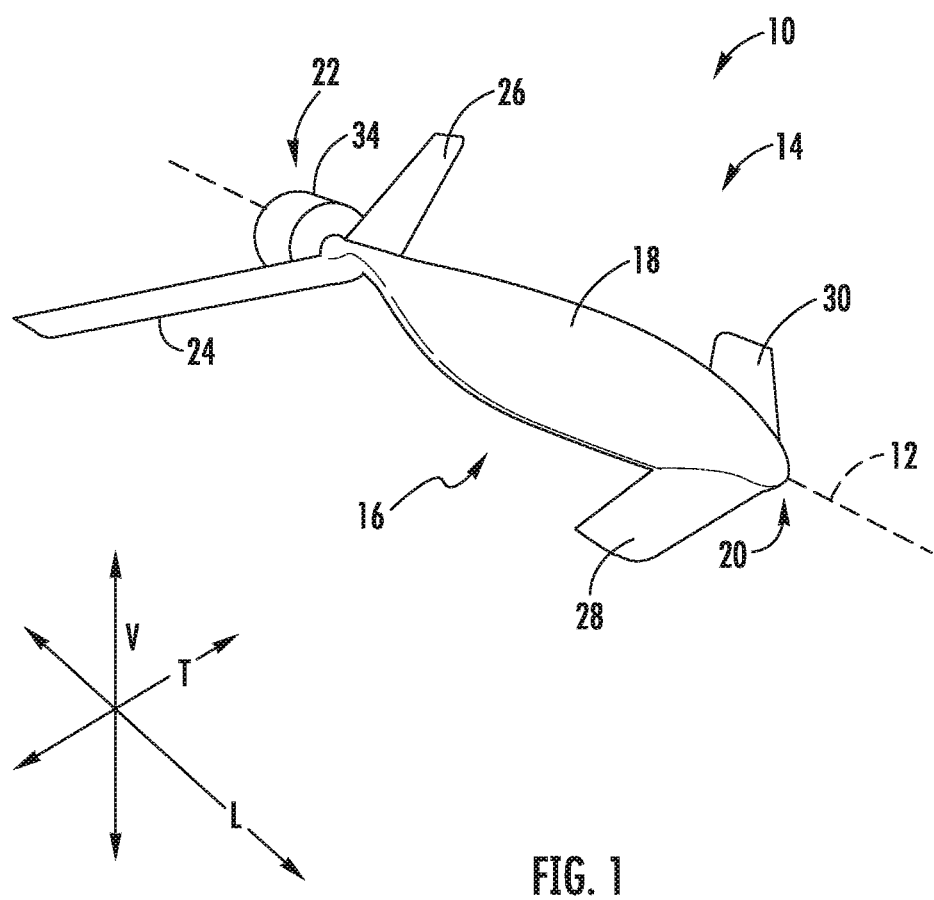
FIG. 1 is a perspective view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a method for operating a propulsion system of a vertical takeoff and landing aircraft subsequent to determining a failure condition of an engine of the propulsion system. For example, the propulsion system may generally include a combustion engine, such as a turbomachine, configured for driving a forward thrust propulsor through a permanent, or selective, mechanical connection therebetween. The same combustion engine may further be configured to drive an electric machine, such that the electric machine operates as an electric generator. Electrical power from the electric machine during such operations may be used at least in part to power one or more dedicated vertical thrust electric fans, and further may be used to charge an electric energy storage unit (e.g., a battery pack).

In the event of a failure condition of the combustion engine, the combustion engine may no longer be capable of mechanically driving the forward thrust propulsor and/or rotating the electric machine to generate electrical power to drive the vertical thrust electric fans. With such an exemplary aspect, the present disclosure allows for the providing of electrical power from, e.g., the electric energy storage unit back to the electric machine, such that the electric machine may operate as an electric motor to mechanically drive the forward thrust propulsor either directly or through the combustion engine. Such may provide for a safer overall aircraft given the additional means for driving the forward thrust propulsor of the propulsion system.

Figure 2:
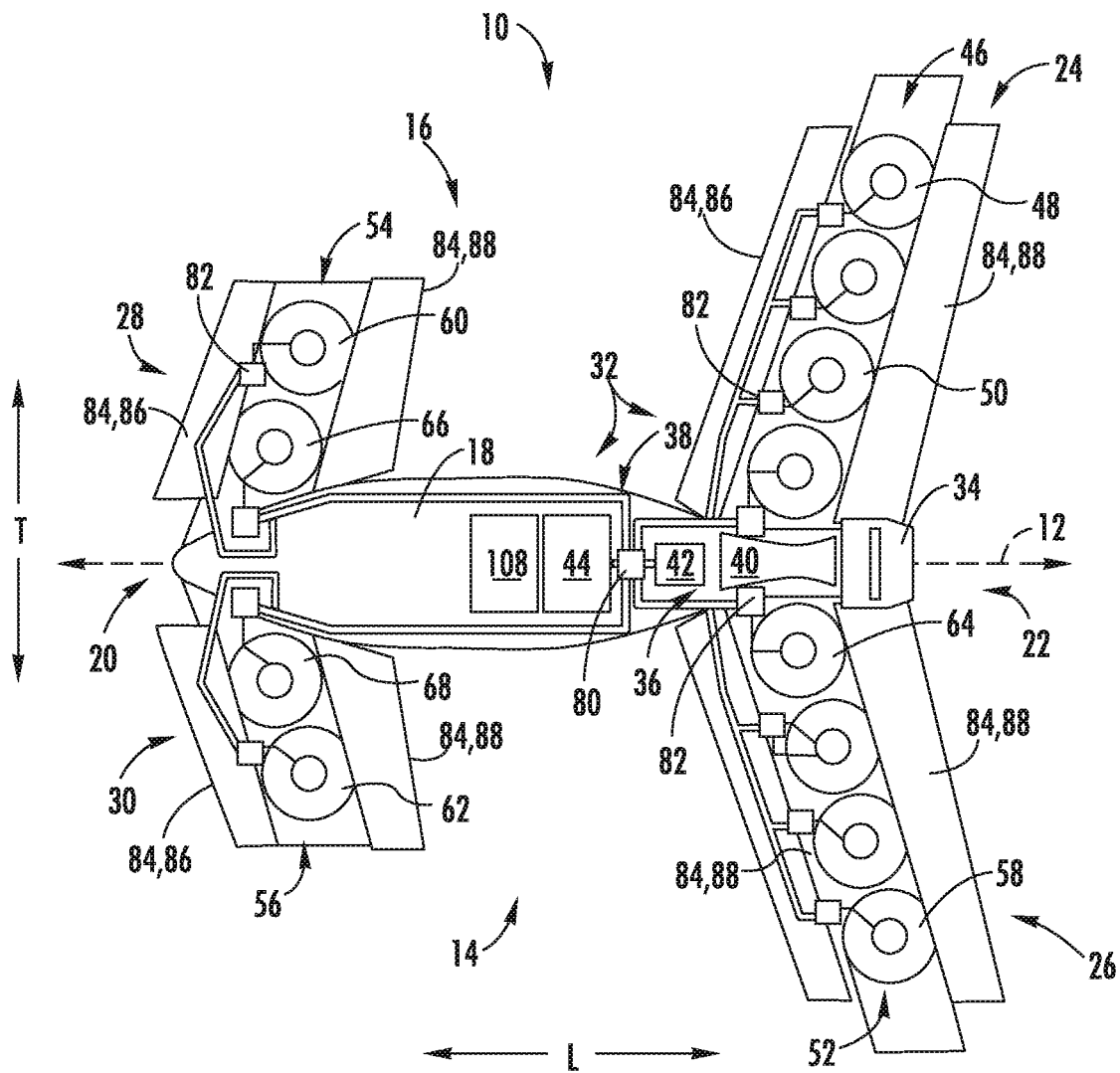
FIG. 2 is a top, schematic of the exemplary aircraft of FIG. 1 in a vertical flight position.
Figure 3:
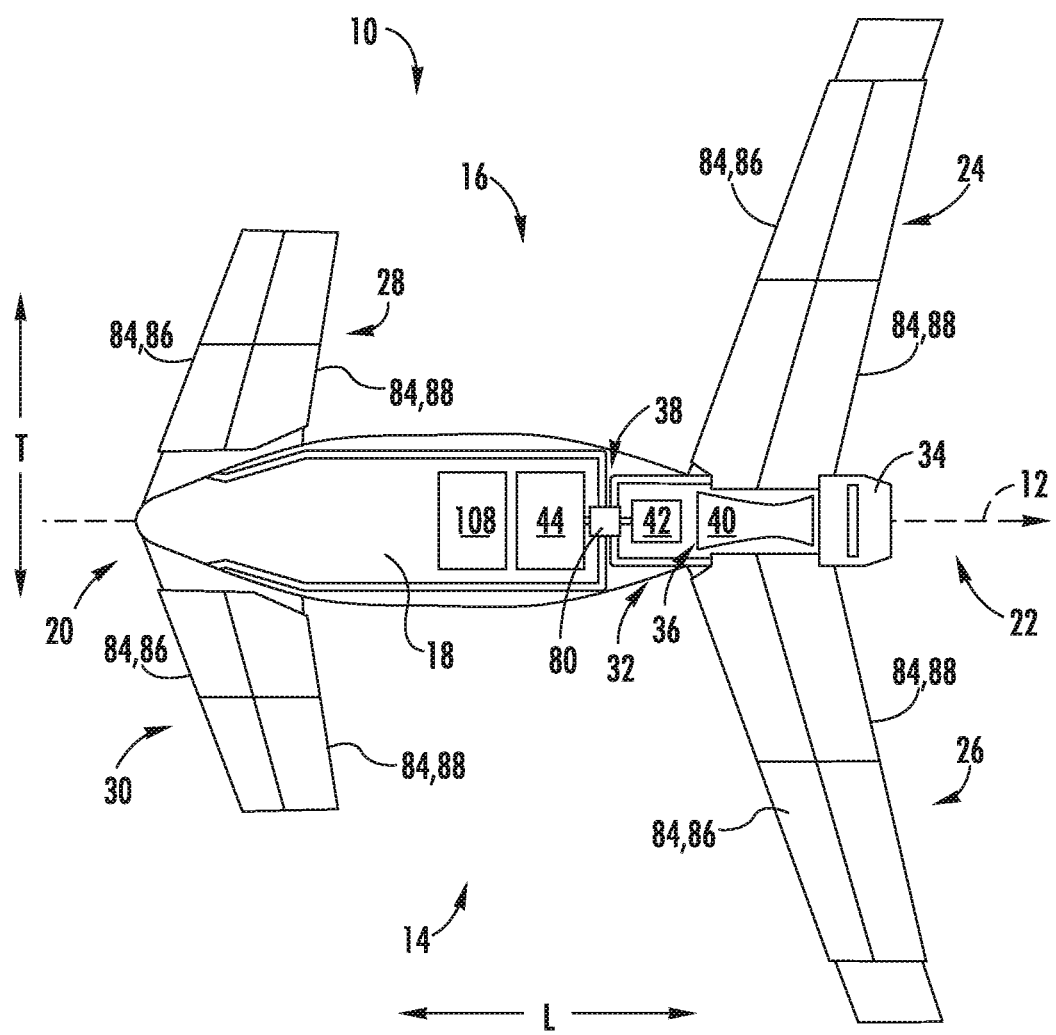
FIG. 3 is a top, schematic of the exemplary aircraft of FIG. 1 in a forward flight position.

Referring now to the drawings, wherein identical numerals indicate the same elements throughout the Figures ("FIGS."), FIGS. 1 through 3 depict an aircraft 10 in accordance with various the exemplary embodiments of the present disclosure. More specifically, FIG. 1 provides a perspective view of the exemplary aircraft 10; FIG. 2 provides a top, schematic view of the exemplary aircraft 10 of FIG. 1 in a vertical thrust configuration; and FIG. 3 provides a top, schematic view of the exemplary aircraft 10 of FIG. 1 in a forward thrust configuration. It will be appreciated that although one exemplary vertical takeoff and landing aircraft 10 is depicted and described herein, the operations for controlling a propulsion system discussed, e.g., with reference to FIG. 11, may be utilized on any other suitable vertical takeoff and landing aircraft.

As shown in FIGS. 1 through 3 collectively, the exemplary aircraft 10 depicted defines a longitudinal direction L (and a longitudinal centerline 12 that extends therethrough), a vertical direction V, and a transverse direction T. Additionally, the aircraft 10 defines a port side 14 and an opposite starboard side 16.

The aircraft 10 includes a fuselage 18 extending between a forward end 20 and an aft end 22 generally along the longitudinal centerline 12 of the aircraft 10. The aircraft 10 additionally includes one or more wings, each extending from the fuselage 18. More specifically, for the embodiment depicted the aircraft 10 includes four wings attached to or formed integrally with the fuselage 18. Specifically, for the embodiment depicted, the aircraft 10 includes a first wing, a second wing, a third wing, and a fourth wing, or more particularly an aft starboard wing 24, an aft port wing 26, a forward starboard wing 28, and a forward port wing 30, and. Each of these wings 24, 26, 28, 30 is attached to, or formed integrally with, the fuselage 18 and extends from the fuselage 18 outwardly generally along the transverse direction T (i.e., outwardly relative to the fuselage 18). It will be appreciated that although the forward port wing 30 and forward starboard wing 28 are depicted as being separate wings, in other embodiments, the forward port wing 30 and forward starboard wing 28 may be formed integrally, and together attached to the fuselage 18. Similarly, although the aft port wing 26 and aft starboard wing 24 are depicted as being separate wings, in other embodiments, the aft port wing 26 and aft starboard wing 24 may be formed integrally, and together attached the fuselage 18.

Although not depicted, in other embodiments, the aircraft 10 may additionally include one or more stabilizers, such as one or more vertical stabilizers, horizontal stabilizers, etc. Moreover, it will be appreciated, that although not depicted, in certain embodiments, one or more of the wings may additionally include flaps, such as leading-edge flaps or trailing edge flaps, for assisting with controlling the aircraft 10 during flight.

Referring still to FIGS. 1 through 3, the exemplary aircraft 10 further includes a propulsion system 32 for providing the aircraft 10 with a desired amount of thrust during operation. Broadly speaking, the exemplary propulsion system 32 includes a plurality of vertical thrust electric fans (or "VTE fans") for generating vertical thrust during operation, a forward thrust propulsor 34, and a power source 36 for driving the plurality of VTE fans and the forward thrust propulsor 34. Additionally, for the embodiment depicted, the propulsion system 32 includes an electric communication bus 38 for, e.g., providing electrical power from the power source 36 to the plurality of VTE fans.

More specifically, for the embodiment depicted, the power source 36 includes a combustion engine 40, an electric machine 42, and an electric energy storage unit 44. As will be described in greater detail below with reference to FIG. 6, the combustion engine 40 is configured to mechanically drive the forward thrust propulsor 34. More specifically, the forward thrust propulsor 34 is selectively or permanently mechanically coupled to the combustion engine 40. Additionally, the combustion engine 40 is coupled to the electric machine 42. Accordingly, in at least certain embodiments, the combustion engine 40 may drive the electric machine 42 such that the electric machine 42 may generate electrical power. In such a manner, the electric machine 42 may be configured as an electric generator. Further, with such an exemplary embodiment the electric machine 42 may provide the electrical power to, e.g., the plurality of VTE fans during at least certain operations of the aircraft, to the electric energy storage unit 44, or both. In such a manner, the plurality of VTE fans may be driven by the power source 36, and more particularly, may be driven at least in part by the electric machine 42 (directly or indirectly through the electric energy storage unit 44).

Referring particularly to FIGS. 2 and 3, the electric energy storage unit 44 may be a battery or other suitable component for storing electrical power. The electric energy storage unit 44 may receive electrical power from, e.g., the electric machine 42 (operating as an electric generator), and store electrical power for use during operation of the aircraft 10. For example, the electric energy storage unit 44 may receive and store electrical power from the electric machine 42 (operating as an electric generator) during certain operations, and subsequently provide electrical power to the plurality of VTE fans during other operations (see, e.g., FIG. 11). Additionally, in still other operations, the electric energy storage unit 44 may provide electrical power back to the electric machine 42 to, e.g., power the aft fan for short durations, power the combustion engine 40 during emergency operations, or add power to the forward thrust propulsor 34 and/or to the combustion engine 40 during high power demand operations. Accordingly, with such exemplary embodiment, the electric machine 42 may further be configured as an electric motor.

Referring to a first of the plurality of wings of the aircraft 10, and more particularly to the aft starboard wing 24 depicted in FIG. 2, the propulsion system 32 includes a first plurality of VTE fans 46 integrated into the aft starboard wing 24 and oriented to generate thrust along the vertical direction V. In such a manner, each of the first plurality of VTE fans 46 are vertical lift fans, and as will be discussed in more detail below, are fixed in position such that they are only capable of generating thrust substantially along the vertical direction V of the aircraft 10. As will be discussed in greater detail below, each of the first plurality of VTE fans 46 is electrically coupled to the power source 36 to receive electrical power from, e.g., the electric machine 42 or the electric energy storage unit 44.

It will be appreciated, that as used herein, the term "along the vertical direction V of the aircraft 10" refers to a vertical direction defined by a normal orientation of the aircraft 10. For example, if the aircraft 10 is, e.g., tilted forward during certain operations, the first plurality of VTE fans 46 may provide thrust in a direction that is still along the vertical direction of the aircraft 10, but tilted relative to absolute vertical direction. Additionally, in this context, the term "substantially" refers to being within about thirty degrees of the vertical direction V of the aircraft 10.

Additionally, the first plurality of VTE fans 46 are arranged along a length of the aft starboard wing 24 generally along the transverse direction T. Additionally, the first plurality of VTE fans 46 includes an outermost VTE fan 48 along the transverse direction T relative to the fuselage 18 of the aircraft 10 and at least one interior VTE fan 50. More particularly, for the embodiment of FIG. 2, the first plurality of VTE fans 46 includes three interior VTE fans 50. However, in other embodiments, the first plurality of VTE fans 46 may have any other suitable number of interior fans, as will be discussed in more detail below.

It will be appreciated that the propulsion system 32 includes a similar plurality of electric fans integrated into the other wings 26, 28, 30 of the aircraft 10. Each of these electric fans are similarly oriented to generate thrust substantially along the vertical direction V of the aircraft 10, and in such a manner may therefore also be configured as VTE fans. More specifically, the propulsion system 32 further includes a second plurality of VTE fans 52 integrated into the aft port wing 26 and arranged along a length of the aft port wing 26, a third plurality of VTE fans 54 integrated into the forward starboard wing 28 and arranged along a length of the forward starboard wing 28, and a fourth plurality of VTE fans 56 integrated into the forward port wing 30 and arranged along a length of the forward port wing 30.

As with the first plurality of VTE fans 46, the second plurality of VTE fans 52 includes an outermost VTE fan 58 along the transverse direction T. Additionally, the third plurality of VTE fans 54 also includes an outermost VTE fan 60 along the transverse direction T and the fourth plurality of VTE fans 56 includes an outermost VTE fan 52 along the transverse direction T.

Further, the second plurality of VTE fans 52 includes at least one interior VTE fan 64, the third plurality of VTE fans 54 includes at least one interior VTE fan 66, and the fourth plurality of VTE fans 56 includes at least one interior VTE fan 68. More specifically, the second plurality of VTE fans 52 includes three interior VTE fans 64, the third plurality of VTE fans 54 includes one interior VTE fan 66, and the fourth plurality of VTE fans 56 also includes one interior VTE fan 68.

It will be appreciated, however, that in other exemplary embodiments, each of the respective pluralities of VTE fans 46, 52, 54, 56 may have any other suitable number of interior VTE fans 50, 64, 66, 68 and further that certain exemplary embodiments, one or more of the first plurality of VTE fans 46, second plurality of VTE fans 52, third plurality of VTE fans 54 and fourth plurality of VTE fans 56 may be configured as variable speed, fixed pitch fans; as variable speed, variable pitch fans; fixed speed, variable pitch fans; or fixed speed, fixed pitch fans.

Moreover, as is depicted in FIG. 2, the electric communication bus 38 electrically connects the power source 36, e.g., the electric machine 42 and/or the electric energy storage unit 44, to each of the pluralities of VTE fans 46, 52, 54, 56 (as will also be described below). Notably, for the embodiment depicted, the electric communication bus 38 includes a main controller 80 and a plurality of electric power controllers 82. The main controller 80 is electrically connected to both the electric machine 42 and the electric energy storage unit 44 and is configured to, e.g., direct electrical power from one or both of the electric machine 42 and electric energy storage unit 44 to each of the pluralities of VTE fans 46, 52, 54, 56 (see also FIGS. 6 and 7). For example, in certain operations, the main controller 80 may direct electrical power from the electric machine 42 to each of the pluralities of VTE fans 46, 52, 54, 56, may direct electrical power from the electric energy storage unit 44 to each of the pluralities of VTE fans 46, 52, 54, 56, may direct electrical power from the electric machine 42 to the electric energy storage unit 44 (e.g., during forward flight), or may direct electrical power from the electric energy storage unit 44 to the electric machine 42 (e.g., during emergency operations or high power demand operations; see FIG. 11). For example, as will be explained in greater detail below, the main controller 80 may direct electrical power from the electric energy storage unit 44 to the electric machine 42 in response to determining a failure condition of the combustion engine 40, such that the electric machine 42 may drive the forward thrust propulsor 34 to provide forward thrust for the aircraft 10 (see, e.g., method 200 of FIG. 11).

More specifically, for the exemplary embodiment of FIG. 2, the electric communication bus 38 includes an electric power controller 82 for each VTE fan (i.e., each VTE fan of the first plurality of VTE fans 46, of the second plurality of VTE fans 52, of the third plurality of VTE fans 54, and of the fourth plurality of VTE fans 56). Additionally, each of the plurality of electric power controllers 82 is associated with one VTE fan of the pluralities of VTE fans 46, 52, 54, 56. More specifically, still, the power source 36 is electrically coupled to each VTE fan of the pluralities of VTE fans 46, 52, 54, 56 through the respective electric power controller 82. In such a manner, the electric power controller 82 may modify an amount of the electric power provided from the power source 36 to each respective VTE fan. Accordingly, for the embodiment shown, the propulsion system 32 includes twelve electric power controllers 82, one for each of the twelve VTE fans included within the propulsion system 32.

Accordingly, in at least certain embodiments each of the electric power controllers 82 may modify an amount of electrical power provided to a respective VTE fan, which as will be appreciated, may allow for the aircraft 10, and more specifically may allow for the main controller 80, to modify a rotational speed of each VTE fan of the pluralities of VTE fans 46, 52, 54, 56. For example, each of the electric power controllers 82 may be operably coupled to the main controller 80 through, e.g., a wired or wireless communication bus (not shown), such that the main controller 80 may control the electrical power provided to each of the individual VTE fans.

Accordingly, it will be appreciated that in at least certain embodiments each VTE fan of the pluralities of VTE fans 46, 52, 54, 56 may be variable speed fans. By modifying an amount of electrical power provided to each VTE fan through a respective electric power controller 82, the aircraft 10 may modify a rotational speed of the respective VTE fan, and therefore an amount of vertical thrust provided by the respective VTE fan. In such a manner, the aircraft 10 may allow for more dynamic control during vertical takeoff and landing, or other vertical thrust operations.

It should be appreciated, however, that in other exemplary embodiments, the aircraft 10, or rather, the electric communication bus 38 may not include an electric power controller 82 for each of the individual VTE fans. Instead, for example, in other embodiments, the electric communication bus 38 may include a single electric power controller 82 for each of the individual pluralities of VTE fans 46, 52, 54, 56, or alternatively, may include a single set of power electronics that performs certain functions for each of the individual pluralities of VTE fans 46, 52, 54, 56. In still other embodiments, however, any other suitable configuration may be provided.

Moreover, as briefly stated above, and as is shown in FIGS. 2 and 3, each of the wings 24, 26, 28, 30 are fixed wings including a variable control portion that is generally movable between a vertical thrust position (FIG. 2) and a forward thrust position (FIG. 3). More specifically, referring now also to FIGS. 4 and 5, providing a side, cross-sectional view of the aft starboard wing 24 and an interior VTE fan 50 of the first plurality of VTE fans 46, the aft starboard wing 24 (as well as the other wings 26, 28, 30, discussed in more detail below) generally includes a variable geometry portion 84. The variable geometry portion 84 is movable between a forward thrust position (FIG. 4), one or more transitional positions (not shown), and a vertical thrust position (FIG. 5), and further is generally formed of a surface portion of the respective wings 24, 26, 28, 30. As will be appreciated, however, a main body or frame portion of the wings 24, 26, 28, 30 remains stationary during this movement for the embodiment depicted.

When the variable geometry portion 84 is moved from the forward thrust position to the vertical thrust position, the first plurality of VTE fans 46 are exposed. By contrast, when the variable geometry portion 84 is moved from the vertical thrust position to the forward thrust position, the first plurality of VTE fans 46 are substantially completely covered. For the embodiment depicted, the variable geometry portion 84 forms a lift fan exhaust arrangement for the first plurality of VTE fans 46 when moved to the vertical thrust position. It will be appreciated, that as used herein, the term "exhaust arrangement" refers generally to any structure located downstream of the respective fan configured to channel at least a portion of an airflow from the respective fan to increase a power loading (i.e., a ratio of thrust produced to an amount of power received) of such fan. For example, the exhaust arrangement may be configured generally as a nozzle or diffuser for the respective fans.

More specifically, for the embodiment depicted, the aft starboard wing 24, or rather, the variable geometry portion 84 of the aft starboard wing 24, generally includes a forward section 86 and an aft section 88. Referring back briefly to FIGS. 2 and 3, it will be appreciated that for the embodiment shown, the forward section 86 and the aft section 88 of the variable geometry portion 84 each extend from the innermost VTE fan of the first plurality of VTE fans 46 to the outermost VTE fan 48 of the first plurality of VTE fans 46. In such a manner, when the variable geometry portion 84 is moved to the vertical thrust position, the exhaust arrangement formed by the variable geometry portion 84 also extends from the innermost VTE fan of the first plurality of VTE fans 46 to the outermost VTE fan 48 of the first plurality of VTE fans 46.

Figure 4:
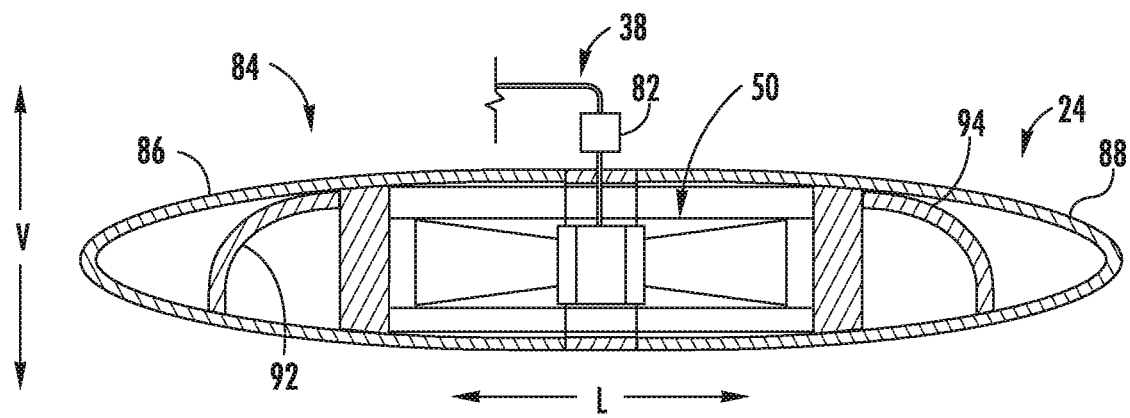
FIG. 4 is a side, schematic view of a wing in accordance with an exemplary embodiment of the present disclosure as may be incorporated into the exemplary aircraft of FIG. 1 in a forward flight position.
Figure 5:
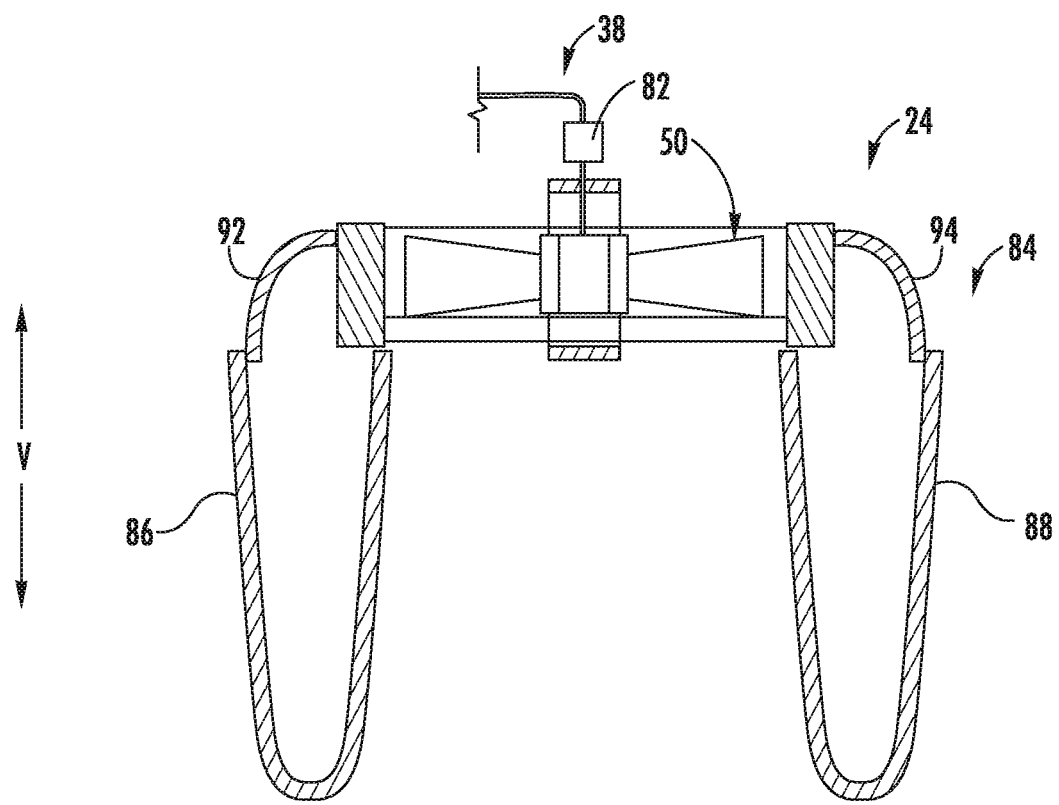
FIG. 5 is a side, schematic view of the exemplary wing of FIG. 4 in a vertical flight position.

Referring particularly to FIG. 4, when the variable geometry portion 84 of the aft starboard wing 24 is in the forward thrust position, the forward section 86 and the aft section 88 together define at least in part an airfoil cross-sectional shape. Such may allow for relatively efficient forward flight for the aircraft 10. By contrast, however, as is depicted in FIG. 5, when the variable geometry portion 84 of the aft starboard wing 24 is moved to the vertical thrust position, the forward section 86 and the aft section 88 of the variable geometry portion 84 together form the exhaust arrangement. For example, in certain exemplary embodiments, the forward section 86 may be mounted on a forward track 90 within the aft starboard wing 24 such that when it is moved from the forward thrust position to the vertical thrust position it translates forward along the lateral direction and pivots downward along the vertical direction V to the position shown in FIG. 5. Similarly, the aft section 88 may be mounted on an aft track 92 within the aft starboard wing 24 such that when it is moved from the forward thrust position to the vertical thrust position it translates aft along the lateral direction and pivots downward along the vertical direction V to the position shown in FIG. 5.

It will additionally be appreciated that each of the remaining wings 26, 28, 30 similarly include a variable geometry portion 84 movable between a forward thrust position and a vertical thrust position, wherein such variable geometry portion 84 forms an exhaust arrangement when in the vertical thrust position. It will be appreciated, however, that in other exemplary embodiments, the variable geometry portion 84 of each wings 24, 26, 28, 30 may have any other suitable configuration for forming an exhaust arrangement for each respective plurality of VTE fans 46, 52, 54, 56 integrated therein.

It will further be appreciated that inclusion of wings 24, 26, 28, 30 having a variable geometry portion 84 for forming an exhaust arrangement for each of the pluralities of VTE fans 46, 52, 54, 56 may allow for much higher efficiency VTE fans. In such a manner, each of the pluralities of VTE fans 46, 52, 54, 56 may be smaller than would otherwise be required to generate a necessary amount of vertical thrust for the aircraft 10 to perform vertical takeoffs, vertical landings, and general hover maneuvers.

Further, with the inclusion of the distributed VTE fans along the length of the respective wings 24, 26, 28, 30 in the manner described herein, combined with the increased efficiency allowed by the exhaust arrangements formed by the respective wings 24, 26, 28, 30, each of the wings 24, 26, 28, 30 may define an aspect ratio providing for relatively efficient forward flight. More specifically, for the embodiment depicted, the aft starboard wing 24 may define an aspect ratio between about 3:1 and about 5.5:1. More specifically, for the embodiment depicted, the aft starboard wing 24 may define an aspect ratio between about 4:1 and about 5:1. Further, the aft port wing 26 may define aspect ratio that is substantially equal to the aspect ratio of the aft starboard wing 24. Further, the forward starboard wing 28 and the forward port wing 30 may each define an aspect ratio between about 1.5:1 and about 5:1, such as between about 2:1 and about 3:1. However, in other exemplary embodiments, the wings 24, 26, 28, 30 may have any other suitable aspect ratio.

It will be appreciated, that as used herein, the term "aspect ratio," with reference to one or more of the wings 24, 26, 28, 30, generally refers to a ratio of the wing's span to its mean chord.

Inclusion of wings configured in such a manner may allow for an overall more efficient aircraft 10. However, in other exemplary embodiments, the aircraft may have any other suitable configuration of wings, VTE fans, and/or variable geometry assemblies acting as a nozzle or diffuser for the VTE fans during certain operations. For example, in other exemplary embodiments, the aircraft 10 may include a telescoping assembly around one or more VTE fans to form a diffusion assembly for the VTE fans. Additionally, or alternatively, in other embodiments, the aircraft may include a multi-piece assembly moveable to form a diffusion assembly for the VTE fans, a fixed structure that forms a diffusion assembly for the VTE fans (exposed or covered during certain operations), etc.

Figure 6:
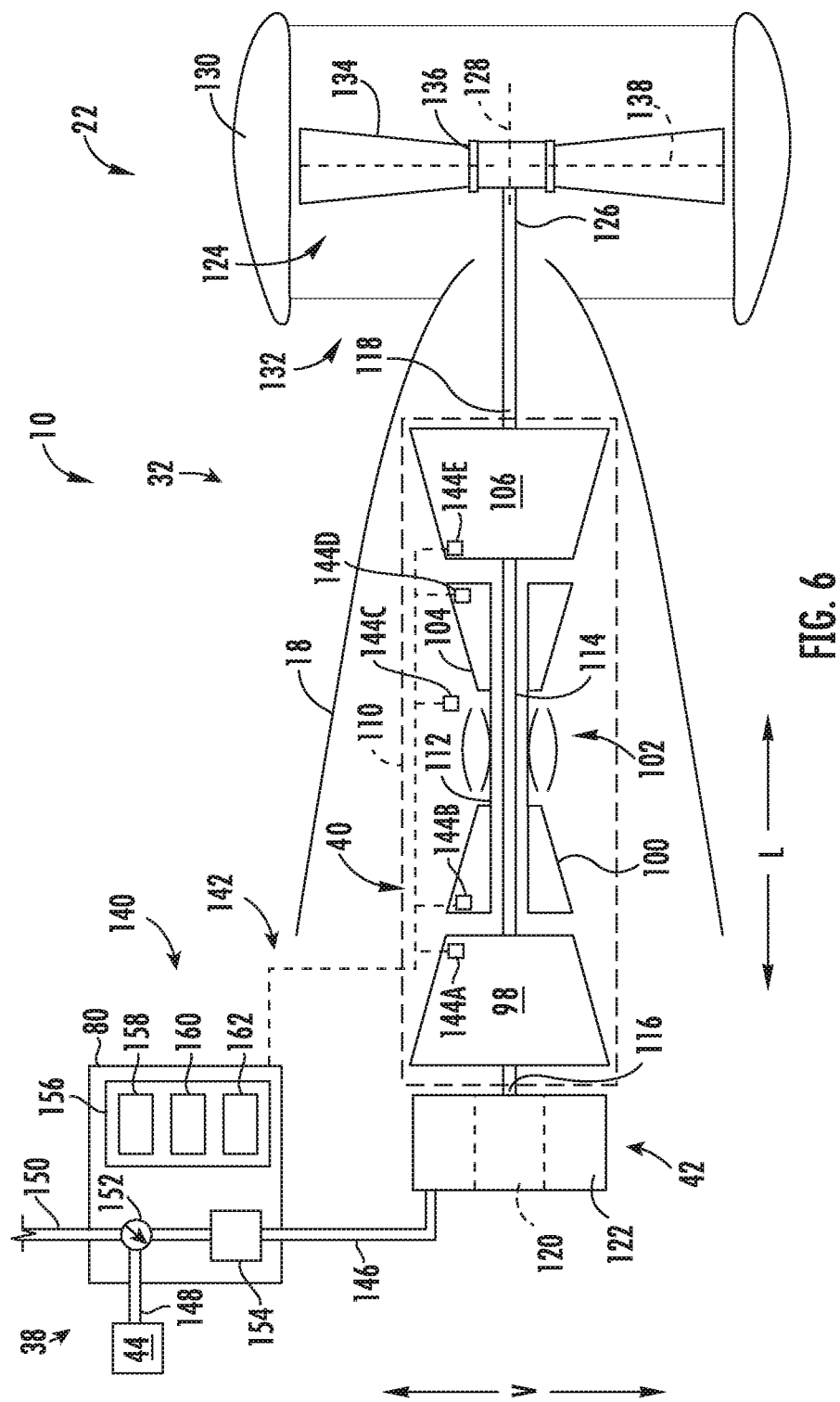
FIG. 6 is a schematic view of a section of a propulsion system of the exemplary aircraft of FIG. 1.

Referring now to FIG. 6, and as noted above, the propulsion system 32 is configured as a hybrid electric propulsion system including the power source 36 (the power source 36 having the combustion engine 40 and the electric machine 42) and the forward thrust propulsor 34, with the forward thrust propulsor 34 selectively or permanently mechanically coupled to the combustion engine 40 of the power source 36. FIG. 6 provides a schematic view of the exemplary combustion engine 40 of the power source 36 of the propulsion system 32 described above with reference to FIGS. 1 through 3. For the embodiment depicted, the combustion engine 40 is a turbomachine 110, and more specifically still, is a turboshaft engine. The turbomachine 110 includes in serial flow order, a compressor section including a low pressure compressor 98 and a high pressure compressor 100, a combustion section 102, and a turbine section including a high pressure turbine 104 and a low pressure turbine 106. During operation, a flow of air is received within the compressor section and is progressively compressed as it flows therethrough, i.e., as it flows from the low pressure compressor 98 to the high pressure compressor 100. The compressed air is then provided to the combustion section 102 where it is mixed with fuel and burned to generate hot combustion gas. The aircraft 10 further includes a fuel tank 108 for providing the fuel to the combustion section 102 (see FIGS. 2 and 3).

The hot combustion gas is expanded through the turbine section where rotational energy is extracted therefrom. Specifically, the hot combustion gas rotates the high pressure turbine 104 and the low pressure turbine 106 as the gas flows therethrough and is expanded. As is depicted in phantom, these components may be enclosed within a casing 110 within, e.g., the fuselage 18 of the aircraft 10. Although not depicted, the hot combustion gas may be exhausted, e.g., to atmosphere, from the low pressure turbine 106.

Also for the embodiment depicted, the high pressure turbine 104 is connected to the high pressure compressor 100 through a high pressure shaft or spool 112, such that a rotation of the high pressure turbine 104 additionally rotates the high pressure compressor 100. Similarly, the low pressure turbine 106 is connected to the low pressure compressor 98 through a low pressure shaft or spool 114, such that rotation of the low pressure turbine 106 additionally rotates the low pressure compressor 98.

It will be appreciated, however, that the exemplary turbomachine 110 depicted in FIG. 6 is provided by way of example only. In other exemplary embodiments, the turbomachine 110 may have any other suitable configuration. For example, in other embodiments, the turbomachine 110 may include any other suitable number of compressors and/or any other suitable number of turbines. Further, in still other embodiments, any other suitable turbomachine engine may be provided, and further still, any other suitable combustion engine may be provided (such as an internal combustion engine).

Referring still to FIG. 6, the low pressure shaft 114 additionally drives an output shaft. More specifically, for the embodiment of FIG. 6, the low pressure shaft 114 additionally drives a first output shaft, or a forward output shaft 116, of the turbomachine 110 and further drives a second output shaft, or an aft output shaft 118 of the turbomachine 110. The forward output shaft 116 extends to the electric machine 42. Accordingly, rotation of the turbomachine 110 provides, at least during certain operations, rotational energy to the electric machine 42 via the forward output shaft 116. The electric machine 42, in turn, is configured to convert the rotational energy to generate electrical power. More specifically, it will be appreciated that at least certain embodiments of the electric machine 42, such as the embodiment shown, may generally include a rotor 120 and a stator 122. The rotational energy of the turbomachine 110 is provided via the forward output shaft 116 and configured to rotate the rotor 120 of the electric machine 42 relative to the stator 122. Such relative movement may generate electrical power.

Inclusion of a turbomachine 110 and electric machine 42 in accordance with such an exemplary embodiment may allow for the electric power source 36 to generate a relatively high amount of electric power and to provide such electric power to the plurality of VTE fans of the propulsion system 32.

As is briefly discussed above, the turbomachine 110 further drives the forward thrust propulsor 34 of the hybrid electric propulsion system 32. For the embodiment depicted, the forward thrust propulsor 34 is comprises a fan 124 coupled to a fan shaft 126. The aft output shaft 118 of the turbomachine 110 is selectively mechanically coupled to, or permanently mechanically coupled to, the fan shaft 126 to allow the turbomachine 110 to drive the fan 124. More specifically, during operation, the aft output shaft 118 of the turbomachine 110 may drive the fan shaft 126 to rotate the fan 124 about a fan axis 128. Notably, the fan 124 of the forward thrust propulsor 34 includes a plurality of fan blades 134 coupled to a disk 136, with the disk 136 coupled to the fan shaft 126 such that rotation of the fan shaft 126 rotates the plurality of fan blades 134. Further, the forward thrust propulsor 34 additionally includes an outer nacelle 130 surrounding at least a portion of the fan 124. In such a manner, the forward thrust propulsor 34 may be referred to as a ducted fan.

It will be appreciated, that as used herein, the term "permanently mechanically coupled to," with reference to the fan shaft 126 and output shaft 118 refers to a coupling that does not allow for the output shaft 118 to be decoupled from, or otherwise freely rotatable relative to, the fan shaft 126 during operation, such as flight operations, of the aircraft 10.

It will further be appreciated that for the embodiment depicted, the forward thrust propulsor 34 is mounted to the fuselage 18 of the aircraft 10 at an aft end 22 of the aircraft 10. Although not depicted, the forward thrust propulsor 34 may include one or more struts, or other structural members, extending between the outer nacelle 130 and the fuselage 18 of the aircraft 10 to mount the forward thrust propulsor 34 to the fuselage 18 of the aircraft 10. Moreover, the forward thrust propulsor 34 is configured as a boundary layer ingestion fan defining an inlet 132 extending substantially 360 degrees around the fuselage 18. In such a manner, the forward thrust propulsor 34 may ingest a boundary layer airflow over the fuselage 18, and may re-energize such airflow to create a forward thrust for the aircraft 10.

It will be appreciated, however, that in other exemplary embodiments, the forward thrust propulsor 34 may have any other suitable configuration. For example, in other exemplary embodiments, the forward thrust propulsor 34 may be mounted at any other suitable location, may include any other suitable components not depicted or described herein, and/or may not include each of the components described herein.

Referring still to the exemplary embodiment depicted in FIG. 6, the exemplary propulsion system 32 further includes a control system 140. For example, the exemplary control system 140 includes the main controller 80, discussed above, as well as a communications network 142 operably connecting the main controller 80 to various aspects of the propulsion system 32 (including, e.g., one or more of the plurality of electric power controllers 82). More specifically, for the embodiment of FIG. 6, the communications network 142 operably connects the main controller 80 to, e.g., a plurality of operability sensors 144 configured to sense one or more operability parameters of the the combustion engine/turbine engine, which as noted above, is configured as the turbomachine 110. For example, the one or more operability sensors 144 includes an LP compressor sensor 144A, an HP compressor sensor 144B, a combustor sensor 144C, an HP turbine sensor 144D, and an LP turbine sensor 144E. These operability sensors 144 may sense data indicative of, e.g., rotational speeds, pressures, temperatures, vibrations, acoustics, etc. In such a manner, these sensors 144 may determine an operability of the turbomachine 110, and further may sense data indicative of a failure condition of the turbomachine 110. For example, the sensors 144 may sense data indicative of a shaft failure event wherein one of the low pressure shaft 114 or high pressure shaft 112 sheers or otherwise fails, a rotor failure event wherein, e.g., one or more rotor blades within a compressor or turbine of the turbomachine 110 detaches or fails, etc. The main controller 80 may determine a failure condition of the turbomachine 110 in response to receiving data from one or more of these operability sensors 144 indicative of such a failure.

In addition, as briefly noted above, the main controller 80 controls an electrical communication between various components of the propulsion system 32. Specifically, for the embodiment depicted, the main controller 80 controls an electrical communication between the electric machine 42, the electric energy storage unit 44, and the plurality of VTE fans (e.g., VTE fans 46, 52, 54, 56). For example, in certain exemplary aspects, the main controller 80 is configured with the electric communication bus 38, such that it may electrically connect the electric machine 42 to the electric energy storage unit 44 (such that the electric machine 42 may provide electric power to the electric energy storage unit 44), to the plurality of VTE fans (such that the electric machine 42 may provide electric power to the plurality of VTE fans), or both. Alternatively, however, in other exemplary embodiments, the main controller 80 may electrically connect the electric energy storage unit 44 directly to the plurality of VTE fans such that the electric energy storage unit 44 provides electric power to the plurality of VTE fans, may electrically connect the electric energy storage unit 44 to the electric machine 42 such that the electric energy storage unit 44 provides electric power to the electric machine 42 (described below), or both.

As is depicted schematically in FIG. 6, the electric communication bus 38 includes a first electric line 146, a second electric line 148, and a third electric line 150. The main controller 80 is electrically coupled to the electric machine 42 through the first electric line 146, electrically coupled to the electric energy storage unit 44 through the second electric line 148, and electrically connected to the plurality of VTE fans through the third electric line 150. It will be appreciated, however, that in other embodiments, the electric communication bus 38 may instead include a plurality of additional electrical connections such that the main controller 80 is electrically connected to individual VTE fans or groups of VTE fans through one or more dedicated electric lines.

In addition, the main controller 80 includes an electric communication switch 152. The electric communication switch 152 is configured to move between various positions to optionally electrically connect one or more of the electric energy storage unit 44, the plurality of VTE fans, and the electric machine 42. Additionally, the main controller 80 includes a power conditioning unit 154 positioned between the electric communication switch 152 and the first electric line 146. The power conditioning unit 154 is configured to convert direct current electric power to alternating current electric power, and further is configured to convert alternating current electric power to direct current electric power.

More specifically, the electric machine 42 may be configured to generate alternating current electric power and provide such alternating current electric power to the main controller 80 through the first electric line 146. For efficiency purposes, it may be desirable to transfer the electric power to the plurality of VTE fans as direct current electric power. In addition, the electric power may be stored by the electric power storage unit 44 as direct current electric power. Accordingly, the power conditioning unit 154 may be configured to receive alternating current electric power from the electric machine 42 and convert such alternating current electric power to direct current electric power prior to the main controller 80 providing such electric power to one or both of the electric energy storage unit 44 and the plurality of VTE fans. During other operations, as will be described below, wherein it may be beneficial to provide electric power back to the electric machine 42, the power conditioning unit 154 may be configured to receive direct current electric power from the electric energy storage unit 44 and convert such direct current electric power to alternating current electric power prior to the main controller 80 providing such electric power to the electric machine 42.

Notably, the main controller 80 further includes a control unit 156. The control unit 156 is in operable communication with, e.g., the one or more operability sensors 144, and further is in operable communication with the electric communication switch 152 described above. Accordingly, the control unit 156 may be configured to direct electric power throughout the propulsion system 32 based on, e.g., an operability of the turbomachine 110.

Figure 11:
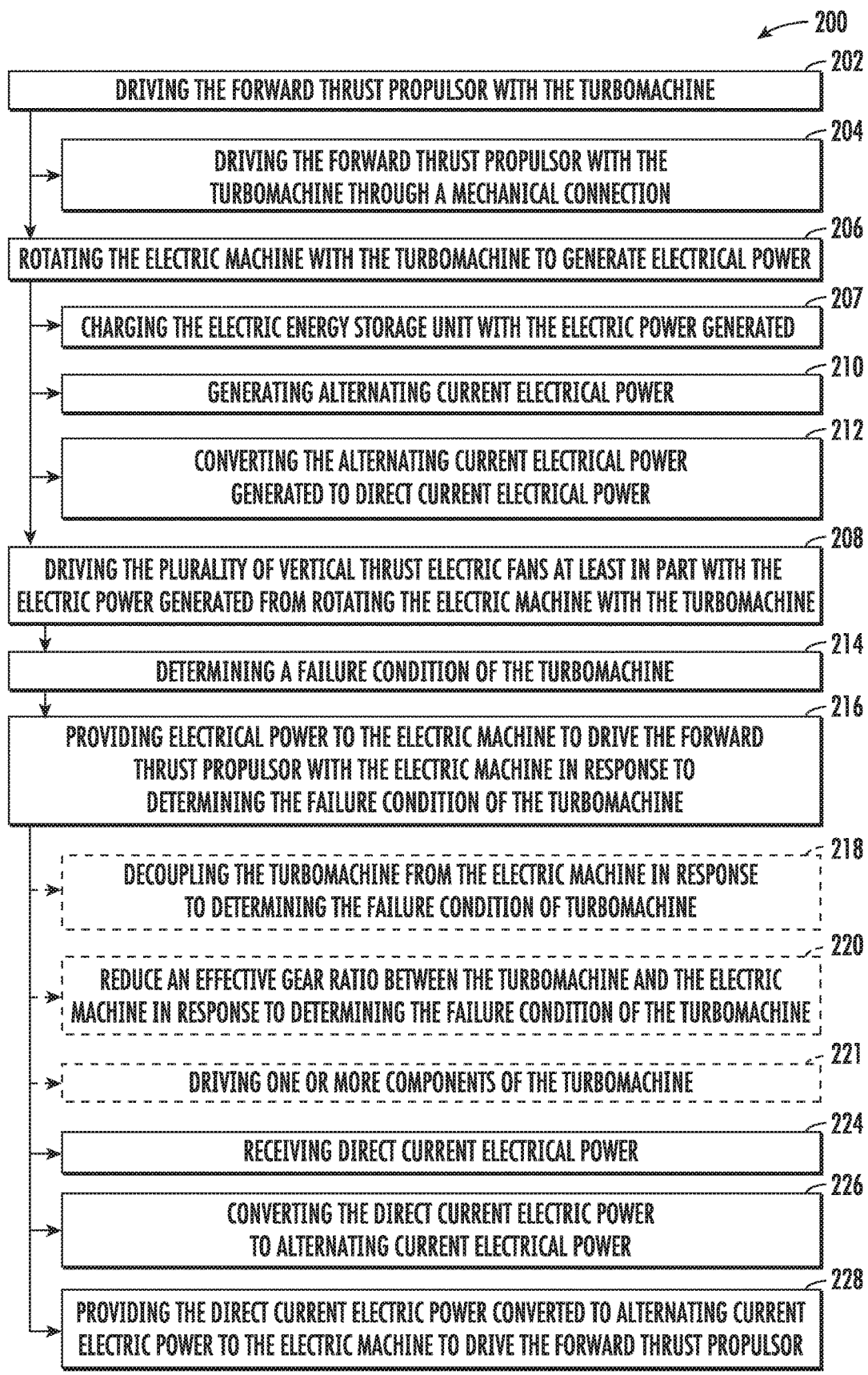
FIG. 11 is a flow diagram of a method of operating a propulsion system in accordance with an exemplary aspect of the present disclosure.

Further, as is depicted, the control unit 156 generally includes one or more processors 158 and memory 160, the memory 160 storing data and instructions 162, which when processed by the one or more processors 158 may allow the control unit 156 to perform certain functions, such as one or more of the functions described herein with reference to FIG. 11.

Further, it will be appreciated that although the control unit 156 and other hardware is depicted as being positioned in the main controller 80, in other exemplary embodiments, one or more of these features may instead be positioned elsewhere, or may otherwise be integrated into any other suitable controller of the propulsion system 32.

Referring still to FIG. 6, it will be appreciated that during at least certain exemplary aspects of the present disclosure, the main controller 80 may determine a failure condition of the turbomachine 110, and in response may provide electric power to the electric machine 42 (such that the electric machine 42 operates as an electric motor as opposed to an electric generator) to drive the forward thrust propulsor 32 with the electric machine 42. For the exemplary embodiment of FIG. 6, the electric machine 42 is mechanically coupled to the forward thrust propulsor 32 through, e.g., the LP shaft 114 of the turbomachine 110, and more specifically through the forward output shaft 116. Accordingly, for the embodiment depicted, the electric machine 42 may further drive one or more components of the turbomachine 110 in the process of driving the forward thrust propulsor 32, and more specifically, may drive the low pressure components (e.g., the LP compressor 98 and the LP turbine 106) for the embodiment depicted. Although such may be a relatively inefficient process for driving the forward thrust propulsor 32, given the failure condition of the turbomachine 110, it may be worth the inefficiency in order to provide forward thrust for the aircraft 10 for a relatively short duration to allow the aircraft to reach a safe position to land.

However, in other exemplary embodiments, the electric machine 42 may be positioned elsewhere such that it is not necessary to drive one or more components of the turbomachine 110 during such emergency operations. For example, referring now to FIG. 7, providing a schematic view of a propulsion system 32 in accordance with another exemplary aspect of the present disclosure, an electric machine 42 of a propulsion system 32 may drive a forward thrust propulsor 32 of the propulsion system 32 during emergency operations without rotating one or more components of a turbomachine 110, or without rotating one or more components of a turbomachine 110 at the same speed.

Figure 7:
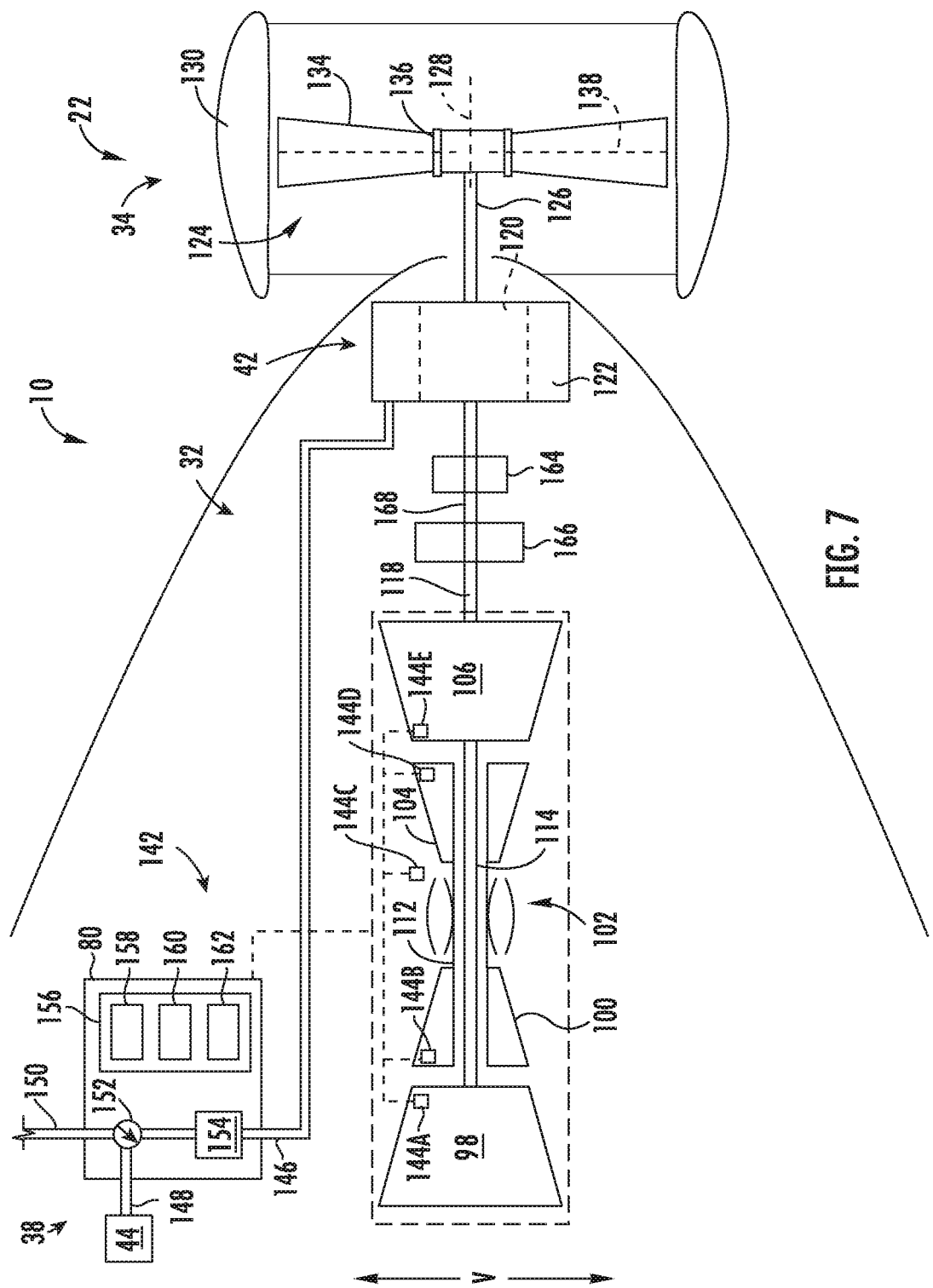
FIG. 7 is a schematic view of a section of a propulsion system of an aircraft in accordance with another exemplary embodiment of the present disclosure.

The exemplary propulsion system 32 of FIG. 7 may be configured in substantially the same manner as exemplary propulsion system 32 described above with reference to FIG. 6. For example, the exemplary propulsion system 32 generally includes the turbine engine, which for the embodiment depicted is a turbomachine 110, the electric machine 42 coupled to the turbomachine 110, and the forward thrust propulsor 32 permanently or selectively mechanically coupled to the turbomachine 110. Specifically, for the embodiment depicted, the forward thrust propulsor 34 is selectively mechanically coupled to the turbomachine 110, and further is coupled to the turbomachine 110 across the electric machine 42. More specifically, for the embodiment depicted, the forward thrust propulsor 32 is selectively mechanically coupled to the turbomachine 110 through a coupling unit 164.

For example, the exemplary turbomachine 110 generally includes an output shaft 118 rotatable with the LP shaft 114 of the turbomachine 110, and the propulsion system 32 generally includes an intermediate shaft 168 and a fan shaft 126. The turbomachine 110 is selectively mechanically coupled to the forward thrust propulsor 34 through the coupling unit 164, with the coupling unit 164 selectively coupling the output shaft 118 to the fan shaft 126. Additionally, the electric machine 42 is positioned between the coupling unit 164 and the forward thrust propulsor 32 (i.e., "between" in the path of mechanical connection therebetween). The coupling unit 164 may be at least one of a clutch or a torque converter. More specifically, for the embodiment depicted, the coupling unit 164 includes a clutch, and more specifically still includes a one-way clutch, such as a sprag clutch, moveable automatically between an engaged position and a disengaged position. When the clutch is a one-way clutch, it may be moved to the disengaged position simply by rotating the fan shaft 126 more quickly than the output shaft 118 (or more specifically, than the intermediate shaft 168 for the embodiment depicted) of the turbomachine 110 in a given direction, or rotating the fan shaft 126 in an opposite direction of the output shaft 118/intermediate shaft 168 of the turbomachine 110. It will be appreciated, however, that in other exemplary embodiments, the clutch may instead be a two-way clutch actuatable between an engaged position and a disengaged position by a controller, such as the main controller 80, based on one or more control decisions.

When the coupling unit 164, or rather the clutch, is in the engaged position, the output shaft 118 of the turbomachine 110 is mechanically coupled to the fan shaft 126 of the propulsion system 32, such that rotation of the output shaft 118 correspondingly rotates the the fan shaft 126, which in turn rotates the electric machine 42 and the forward thrust propulsor 32. By contrast, when the clutch is in the disengaged position, the output shaft 118 of the turbomachine 110 is not mechanically coupled to the fan shaft 126 of the forward thrust propulsor 34, such that rotation of the output shaft 118 does not rotate the fan shaft 126, and similarly, rotation of the fan shaft 126 (e.g., by the electric machine 42) does not rotate the output shaft 118 of the turbomachine 110. In such a manner, it will be appreciated that when the clutch is in the disengaged position, the electric machine 42 may drive the fan shaft 126 to rotate the forward thrust propulsor 32 and generate a forward thrust for the aircraft 10 without rotating one or more components of the turbomachine 110. Such may provide for relatively efficient operation subsequent to determining a failure condition of the turbomachine 110.

Further, still, for the embodiment depicted in FIG. 7, the aircraft 10 additionally includes a speed change mechanism 166, with turbomachine 110 being mechanically coupled to the electric machine 42 and forward thrust propulsor 34 through the speed change mechanism 166. In at least certain exemplary embodiments, the speed change mechanism 166 may be a planetary gear box, a transmission, or any other suitable speed change mechanism 166.

Figure 8:
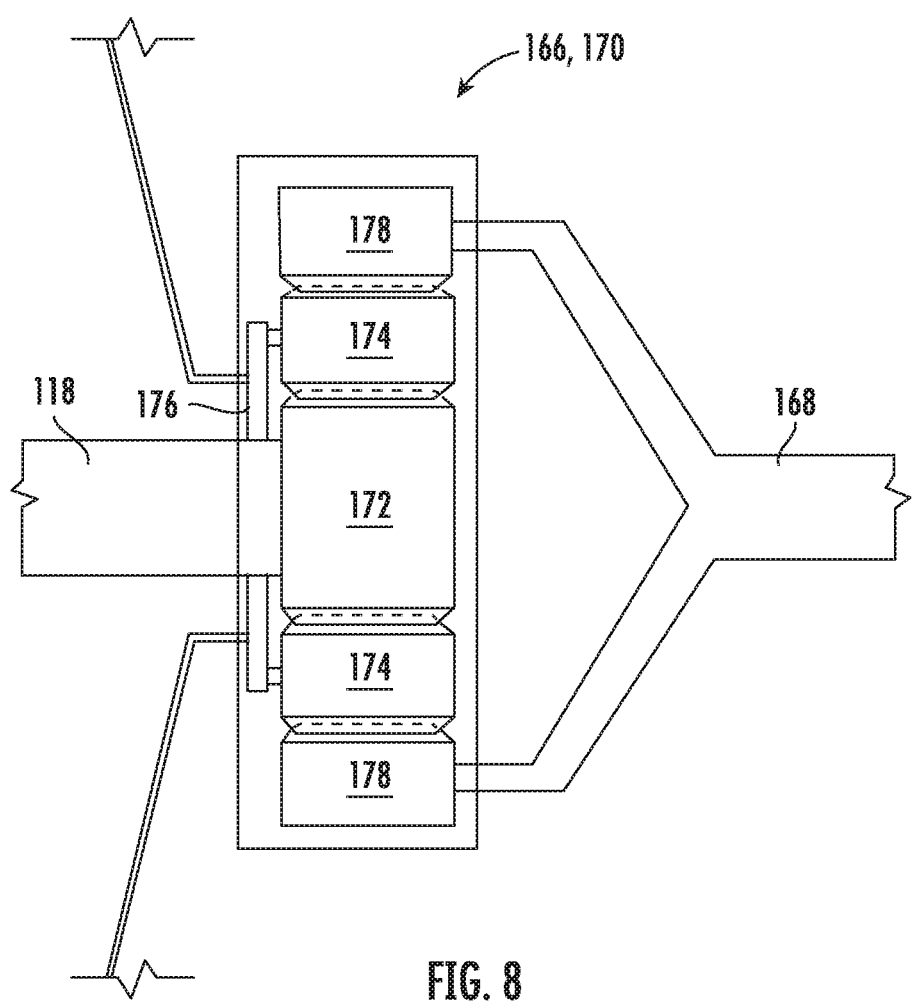
FIG. 8 is a close-up, schematic view of a gearbox in accordance with an exemplary embodiment of the present disclosure.

For example, referring briefly to FIG. 8 a close-up, side, cross-sectional view is provided of an exemplary planetary gear box 154 as may be incorporated into the propulsion system 32 of FIG. 7 as the speed change mechanism 166 depicted. As is shown in FIG. 8, the planetary gear box 154 generally includes a sun gear 172 coupled to the output shaft 118, a plurality of planet gears 174 coupled to a planet gear carrier 176 (with the planet gear carrier 176 coupled to a structural component of the aircraft 10), and a ring gear 178 coupled to the fan shaft 126 of the forward thrust propulsor 34 (or more particularly coupled to the intermediate shaft 168, which is, in turn, coupled to the fan shaft 126 across the coupling unit 164). In such a manner, a rotational speed of the fan 124 of the forward thrust propulsor 34 may be modified relative to a rotational speed of the aft output shaft 118 of the turbomachine 110. Accordingly, such may allow for the fan 124 of the forward thrust propulsor 34 to rotate at, e.g. a lower rotational speed relative to the aft output shaft 118, which may result in a more efficient forward thrust propulsor 34.

It will be appreciated, however, that in other exemplary embodiments, the planetary gear box 154 may have any other suitable configuration. For example, in other embodiments, the aft output shaft 118 may be coupled to the ring gear 178, or the planet gear carrier 176, and further, the fan shaft 126/intermediate shaft 168 may be coupled to the sun gear 172 or planet gear carrier 176.

However, as noted above, in other embodiments any other suitable speed change mechanism 166 may be utilized. For example, in other exemplary embodiments, the speed change mechanism 166 may be a variable-gear ratio gearbox or a transmission, such that the turbomachine 110 is instead mechanically coupled to the electric machine 42 and the forward thrust propulsor 34 through such variable-gear ratio gearbox or transmission. For example, in in certain embodiments, the suitable speed change mechanism 166 may be one of a continuously variable transmission 164 or a hydraulic transmission.

Figure 9:
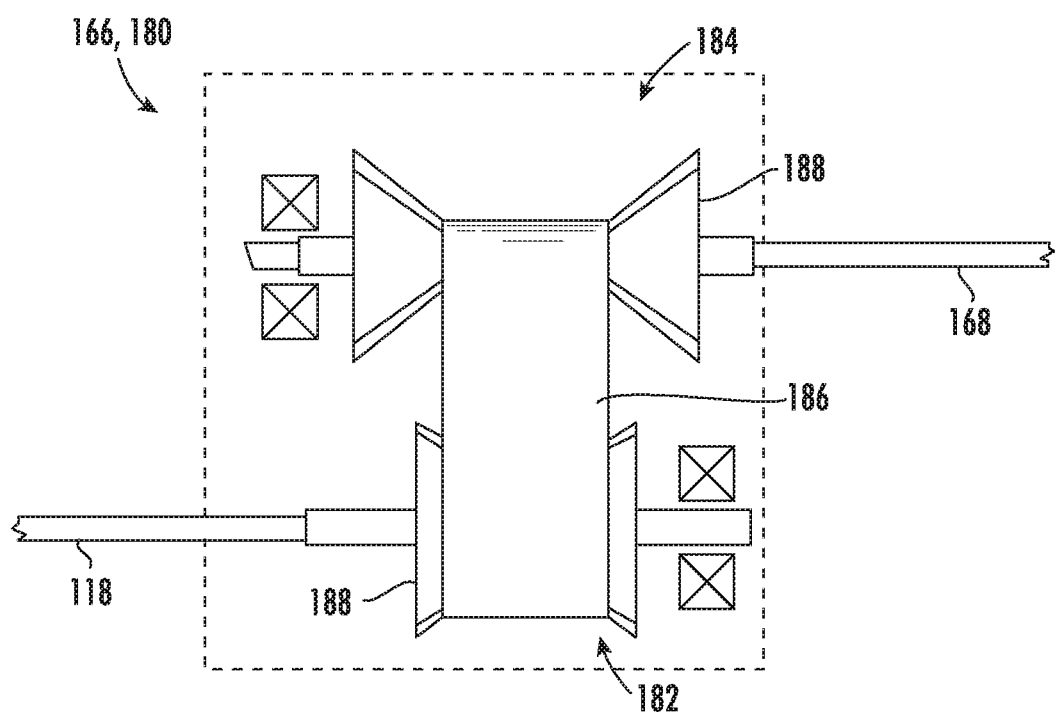
FIG. 9 is a close-up, schematic view of a transmission in accordance with an exemplary embodiment of the present disclosure.

For example, referring now to FIG. 9, a schematic view is provided of a continuously variable transmission 180 as may be incorporated into the propulsion system 32 of FIG. 7 as the speed change mechanism 166 depicted. As is depicted, the exemplary continuously variable transmission 180 generally includes a first gear 182 and a second gear 184 coupled through a belt 186. The first gear 182 may be coupled to the aft output shaft 118 of the turbomachine 110 and the second gear 184 may be coupled to the fan shaft 126 (via of the intermediate shaft 168 and the coupling unit 164 for the embodiment of FIG. 7)). Each of the first gear 182 and second gear 184 generally include opposing conical shaped members 188 movable closer to one another (see, e.g., the first gear 182), and further movable away from another (see, e.g., the second gear 184). By moving the opposing conical shaped members 188 of the second gear 184 and first gear 182 closer to one another or further away from another, the continuously variable transmission 180 may provide a large variety of gear ratios to rotatably connect the aft output shaft 118 of the turbomachine 110 to the fan shaft 126.

It will be appreciated, however, that in other exemplary embodiments, any other suitable continuously variable transmission 180 (or variable-gear ratio gearbox) may be provided. For example, in other embodiments, the continuously variable transmission 180 may be a variable diameter pulley type transmission, a roller based transmission, a magnetic transmission, an infinitely variable transmission, a cone transmission, etc.

Notably, the continuously variable transmission 180 (or variable-gear ratio gearbox) may be operably coupled to the control system 142 (and main controller 80) such that a speed ratio thereacross may be modified based on one or more control decisions. For example, the speed ratio may be dropped close to zero (or to a lower available range) in response to determining a failure event of the turbomachine 110, such that the electric machine 42 may drive the forward thrust propulsor 34 at a relatively high speed and rotate the turbomachine at a relatively low speed.

Moreover, it will be appreciated that although for the embodiment depicted, the aircraft 10 includes the speed change mechanism 166 located forward of the coupling unit 180, in other embodiments, the relative locations of these components may be reversed. Further, although the exemplary aircraft 10 depicted includes the speed change mechanism 166 and the coupling unit 164, in other exemplary embodiments, the aircraft 10 may not include each of these components/features. For example, in other embodiments, the aircraft 10 may rely solely on the coupling unit 164 to decoupled the electric machine 42 from the turbomachine 110 during a failure condition of the turbomachine 110 (or vertical thrust operations), or alternatively, may only include the speed change mechanism 166 to reduce a degree to which the electric machine 42 rotates the turbomachine 110 during a failure condition of the turbomachine 110 (or vertical thrust operations).

A vertical takeoff and landing aircraft having a forward thrust propulsor 32 mechanically coupled to a combustion engine and an electric machine 42 in accordance with one or more embodiments of the present disclosure may allow for a more dependable propulsion system 32. For example, such a configuration may allow for such a hybrid electric propulsion system 32 to continue delivering forward thrust despite a failure condition of the combustion engine, which would otherwise prevent the forward thrust propulsor 32 from providing such forward thrust.

It will be appreciated, that in other exemplary embodiments, the aircraft 10 and propulsion system 32 may have any other suitable configuration. For example, referring now briefly to FIG. 10, an aircraft 10 including a propulsion system 32 in accordance with another exemplary embodiment of the present disclosure is provided. The exemplary aircraft 10 and propulsion system 32 of FIG. 10 may be configured in substantially the same manner as one or more of the exemplary aircraft 10 and propulsion systems 32 described above with reference to FIGS. 1 through 9. For example, the aircraft 10 generally includes a fuselage 18 and one or more wings, and defines a forward end 20, an aft end 22, a port side 14, and a starboard side 16. Further, the exemplary propulsion system 32 generally includes a power source 36 and a plurality of vertical thrust electric fans ("VTE fans") driven by the power source 36. As with the embodiments above, each of the plurality of VTE fans is electrically coupled to the power source 36 to receive electrical power from, e.g., an electric machine 42 or an electric energy storage unit 44 of the power source 36.

However, for the embodiment depicted, the aircraft 10 does not include four wings arranged in a canard configuration (compare, e.g., FIG. 1), and instead includes two wings—i.e., a first wing 24 extending from the fuselage 18 of the aircraft 10 on the starboard side 16 of the aircraft 10 and a second wing 26 extending from the fuselage 18 of the aircraft 10 on the port side 14 of the aircraft 10. Notably, however, in still other exemplary embodiments, the aircraft 10 may have still other suitable configurations. For example, in still other exemplary embodiments, the aircraft 10 may have a blended-wing configuration.

Figure 10:
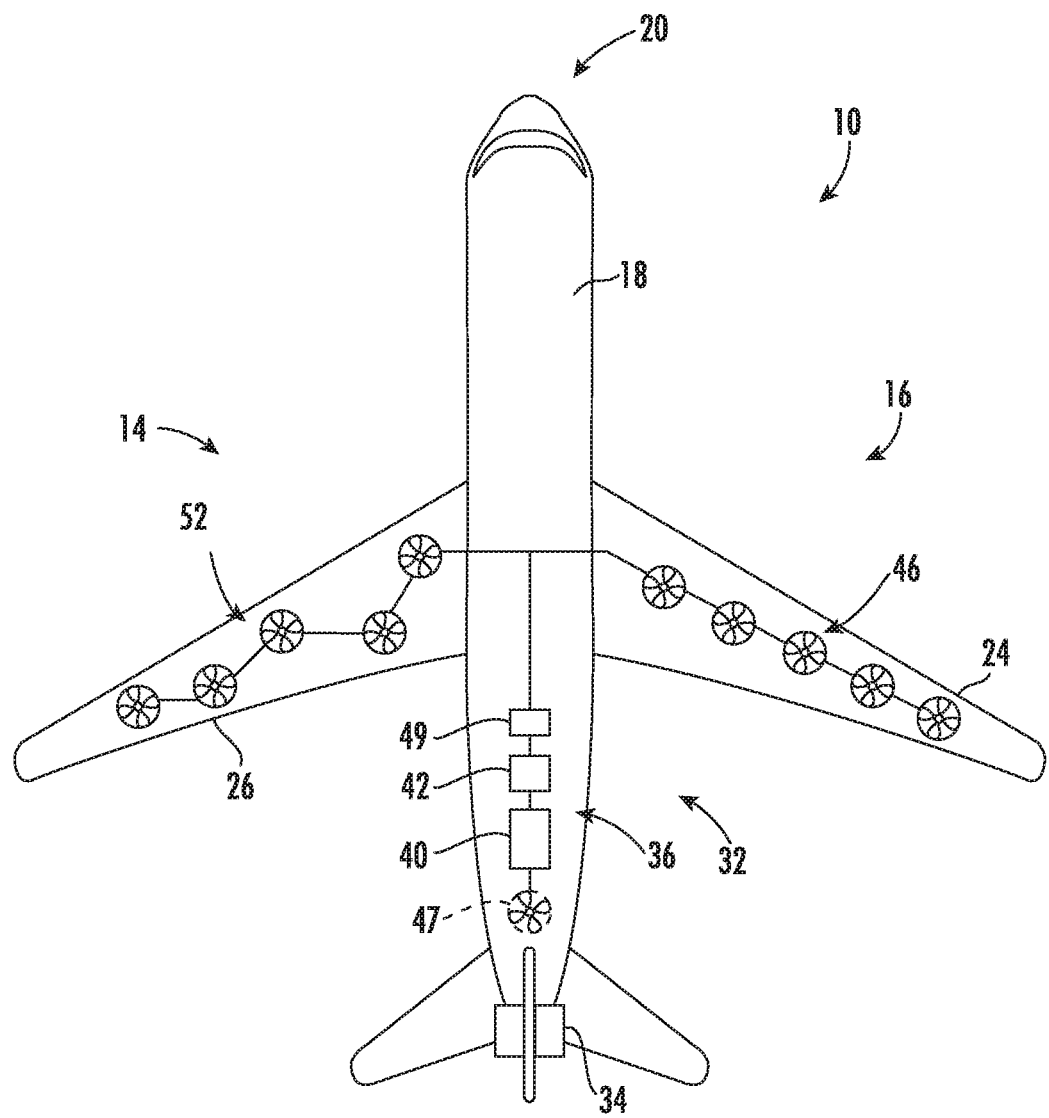
FIG. 10 is a top, schematic view of an aircraft in accordance with another exemplary embodiment of the present disclosure.

Referring still to FIG. 10, for the embodiment depicted the exemplary propulsion system 32 further varies from the embodiments of FIGS. 1 through 9. For example, the exemplary propulsion system 32 includes a first plurality of VTE fans 46 arranged generally along a length of the first wing 24 and a second plurality of VTE fans arranged generally along a length of the second wing 26. However, given that the exemplary aircraft 10 of FIG. 10 only includes two wings, the propulsion system 32 does not include a third or fourth plurality of VTE fans (cf., e.g., FIG. 2).

Further, as will be appreciated, the pluralities of VTE fans 46, 52 may be arranged in any suitable manner along the lengths of the respective first and second wings 24, 26. Specifically for the embodiment show, the first plurality of VTE fans 46 are arranged in a substantially linear manner along the length of the first wing 24. By contrast, however, the second plurality of VTE fans 52 are arranged in a staggered manner along the length of the second wing 26. Although the first and second pluralities of VTE fans 46, 52 are arranged in different manners for the embodiment shown, such is simply for explanatory purposes. In other embodiments, the first and second pluralities of VTE fans 46, 52 may each be arranged in a linear manner or in a staggered manner along the lengths of the wings 24, 26, or further in any other suitable manner (such as a hybrid linear-staggered configuration).

Additionally, although not depicted in FIG. 10, in certain exemplary embodiments, the wings 24, 26 may include any suitable variable geometry assembly or assemblies for exposing and/or covering one or more of the VTE fans 46, 52 during operation, such as during vertical flight operations or forward flight operations, as well as any suitable diffusion assembly or assemblies. For example, in certain embodiments, the wings 24, 26 may include one or more of the exemplary variable geometry assemblies and/or diffusion assemblies described above with reference to FIGS. 2 through 6.

Further, the exemplary propulsion system 32 depicted includes, a forward thrust propulsor 34 for generating forward (and optionally reverse) thrust during certain operations. For the embodiment depicted, the forward thrust propulsor 34 is mounted to the fuselage 18 of the aircraft 10 at the aft end 22 of the aircraft 10, and more specifically the forward thrust propulsor 34 is configured as a boundary layer ingestion fan for the embodiment shown. In such a manner, the forward thrust propulsor 34 may be configured in a similar manner as the forward thrust propulsor 34 described above with reference to FIGS. 2 through 6. However, in other embodiments, any other suitable forward thrust propulsor (or propulsors) 34 may be provided, such as one or more under-wing, fuselage, or stabilizer mounted forward thrust propulsors, such as one or more turbofan, turboprop, or turbojet engines.

Additionally, as is depicted in phantom, in certain exemplary embodiments, the propulsion system 32 may further include one or more VTE fans 47 positioned elsewhere in the aircraft 10, such as in the fuselage 18 proximate the aft end 22 of the aircraft 10 as is depicted in phantom in the embodiment of FIG. 10. In such a manner, such VTE fan(s) 47 may additionally be in electrical communication with the power source 36 such that the power source 36 may drive the fuselage-embedded VTE fan(s) 47. Notably, the VTE fan(s) 47 may include any suitable diffusion assembly, such as one or more of the diffusion assemblies discussed herein with reference to the VTE fans 46.

In other embodiments, however, still other configurations may be provided.

Referring now to FIG. 11, a method 200 of operating a propulsion system of a vertical takeoff and landing aircraft is provided. The method 200 may be used to operate one or more the exemplary propulsion systems described above with reference to, e.g., FIGS. 1 through 10, or alternatively may operate any other suitable propulsion system. Accordingly, for example, the propulsion system operated by the method 200 may include a combustion engine (such as a turbomachine, such as a turboshaft engine), an electric machine, a forward thrust propulsor, and a plurality of vertical thrust electric fans. The plurality of vertical thrust electric fans may be fixed in position and, e.g., spaced along a length of the wing, to provide thrust for the aircraft along a vertical direction of the aircraft during, e.g., takeoff and landing operations.

The method 200 generally includes at (202) driving the forward thrust propulsor with the turbomachine. More specifically, for the exemplary aspect depicted, driving the forward thrust propulsor with the turbomachine at (202) includes at (204) driving the forward thrust propulsor with the turbomachine through a mechanical connection. As will be appreciated from the description below, in at least certain exemplary aspects, the mechanical connection may be a permanent mechanical connection, or alternatively, may be a selective mechanical connection. Additionally, in certain exemplary aspects, the electric machine may be positioned between the turbomachine and the forward thrust propulsor, such that the turbomachine is mechanically coupled to the forward thrust propulsor across the electric machine (see, e.g., FIG. 8). However, in other exemplary aspects, the electric machine may instead be positioned on an alternate side of the turbomachine (see, e.g., FIG. 6).

Referring still to the exemplary method 200 of FIG. 11, the method 200 additionally includes at (206) rotating the electric machine with the turbomachine to generate electrical power. For example, in certain exemplary aspects, rotating the electric machine with the turbomachine at (206) may include rotating the electric machine with the turbomachine during takeoff flight operations, during cruise flight operations, and/or during landing flight operations. Notably, for the exemplary aspect depicted, the propulsion system further includes an electric energy storage unit, and rotating the electric machine with the turbomachine to generate electrical power at (206) includes providing at least one of an electric energy storage unit or the plurality of vertical thrust electric fans with direct current electric power, and more specifically includes at (207) charging the electric energy storage unit with the electric power generated.

Further, the method 200 includes at (208) driving the plurality of vertical thrust electric fans at least in part with the electric power generated from rotating the electric machine with the turbomachine at (206). Driving the plurality of vertical thrust electric fans at (208) may include providing electrical power directly from the electric machine to the plurality of vertical thrust electric fans, or alternatively, may include providing electrical power to the electric energy storage unit, and subsequently transferring electrical power from the electric energy storage unit to the plurality of vertical thrust electric fans.

It will be appreciated that in certain exemplary aspects, such as the exemplary aspect of the method 200 depicted, rotating the electric machine with the turbomachine to generate electrical power at (206) includes at (210) generating alternating current electrical power and at (212) converting the alternating current electrical power generated to direct current electrical power. For example, converting the alternating current electric power to direct current electric power at (212) may include converting the alternating current electric power to direct current electric power using one or more power converters.

Referring still to the exemplary method 200 FIG. 11, the method 200 further includes at (214) determining a failure condition of the turbomachine. Determining the failure condition of the turbomachine at (214) may include determining the failure condition of the turbomachine based on data sensed from one or more operability sensors of the turbomachine. For example, the operability sensors may sense data indicative of a rotational speed of one or more shafts of the turbomachine, an operational pressure within the turbomachine, etc., with such data indicating a failure condition of the turbomachine. In such a manner, it will be appreciated that the failure condition of the turbomachine may be at least one of a shaft failure or a rotor failure of the turbomachine. In such a manner, it will be appreciated that in the event of such a failure condition of the turbomachine, the turbomachine may no longer be capable of driving the forward thrust propulsor of the propulsion system and/or the electric machine.

Accordingly, the exemplary method 200 additionally includes at (216) providing electrical power to the electric machine to drive the forward thrust propulsor with the electric machine in response to determining the failure condition of the turbomachine at (214). For the exemplary aspect depicted, driving the forward thrust propulsor with the electric machine comprises driving the forward thrust propulsor with the electric machine through a mechanical connection.

As noted, in the event of a failure condition of the turbomachine, the turbomachine may no longer be capable of driving the forward thrust propulsor. Accordingly, in certain exemplary aspects the method 200 may be configured to increase an efficiency of the propulsion system by reducing a load on the electric machine during such operations. For example, for exemplary aspects wherein the turbomachine is selectively mechanically coupled to the forward thrust propulsor, the method 200 may include at (218) decoupling the turbomachine from the electric machine in response to determining the failure condition of turbomachine at (214). In certain exemplary aspects, decoupling the turbomachine from the electric machine at (218) may include decoupling the turbomachine from the electric machine using a coupling unit, such as a one-way clutch or a two-way clutch, positioned between electric machine and the turbomachine.

Additionally, or alternatively, the method 200 may at (220) reduce an effective gear ratio between the turbomachine and the electric machine in response to determining the failure condition of the turbomachine at (214). For example, in certain exemplary aspects, the forward thrust propulsor may be mechanically coupled to the turbomachine through a speed change mechanism, such as a gearbox or transmission. With such an exemplary aspect, reducing the effective gear ratio between the turbomachine and the electric machine at (220) may include reducing a gear ratio of the gearbox or transmission such that the turbomachine rotates more slowly than the forward thrust propulsor. Operating the propulsion system in such a manner may allow for more efficient operations, as the electric machine may not need to drive one or more components of the turbomachine in order to additionally drive the forward thrust propulsor.

It will be appreciated, that in other exemplary aspects, the electric machine may be permanently mechanically coupled to the turbomachine, such that the method does not include decoupling the turbomachine from the electric machine at (218) or reducing the effective gear ratio between the turbomachine and the electric machine at (220). With such an exemplary aspect, as is depicted in phantom, providing electric power to the electric machine to drive the forward thrust propulsor at (216) may include at (221) driving one or more components of the turbomachine. Notably, however, given that the electric machine will be operating during emergency operations, it may be sufficient to accept the inefficiency and have electric machine drive one or more components of the turbomachine in addition to the forward thrust propulsor at (216).

Referring still to the exemplary aspect of FIG. 11, for the exemplary aspect depicted, the propulsion system further includes an electric energy storage unit. In such an exemplary aspect, providing electrical power to the electric machine to drive the forward thrust propulsor at (216) further includes at (222) providing electrical power to the electric machine from the electric energy storage unit. Notably, the electric energy storage unit may be configured to store direct current electrical power. With such an exemplary aspect, it will be appreciated that providing electrical power to the electric machine to drive the forward thrust propulsor at (216) further includes at (224) receiving direct current electrical power (e.g., from the electric energy storage unit), at (226) converting the direct current electric power to alternating current electrical power, and at (228) providing the direct current electric power converted to alternating current electric power to the electric machine to drive the forward thrust propulsor. Operating the propulsion system in such a manner may allow for relatively efficient storage and transfer in direct current form of the electric power generated, while still allowing for generating and usage of such electric power in alternating current form by the electric machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a propulsion system of a vertical takeoff and landing aircraft, the propulsion system comprising a turbomachine, an electric machine, a forward thrust propulsor, and a plurality of vertical thrust electric fans, the method comprising:
    driving the forward thrust propulsor with the turbomachine;
    rotating the electric machine with the turbomachine to generate direct current electrical power;
    driving the plurality of vertical thrust electric fans at least in part with the direct electric power generated from rotating the electric machine with the turbomachine;
    determining a failure condition of the turbomachine; and
    providing an alternating current electrical power to the electric machine to drive the forward thrust propulsor with the electric machine in response to determining the failure condition of the turbomachine by converting the direct current electrical power to alternating current electrical power, and providing the alternating current electric power to the electric machine to drive the forward thrust propulsor.

2. The method of claim 1, wherein driving the forward thrust propulsor with the turbomachine comprises driving the forward thrust propulsor with the turbomachine through a mechanical connection.

3. The method of claim 2, wherein the turbomachine is mechanically coupled to the forward thrust propulsor across the electric machine.

4. The method of claim 2, further comprising:
    decoupling the turbomachine from the electric machine in response to determining the failure condition of the turbomachine.

5. The method of claim 2, further comprising:
reducing an effective gear ratio between the turbomachine and the electric machine in response to determining the failure condition of the turbomachine.

6. The method of claim 2, wherein providing electrical power to the electric machine to drive the forward thrust propulsor comprises driving one or more components of the turbomachine with the electric machine.

7. The method of claim 1, wherein rotating the electric machine with the turbomachine to generate electrical power comprises generating alternating current electrical power and converting the alternating current electrical power generated to direct current electrical power.

8. The method of claim 7, wherein rotating the electric machine with the turbomachine to generate electrical power further comprises providing an electric energy storage unit with direct current electric power.

9. The method of claim 1, wherein the propulsion system further comprises an electric energy storage unit, and wherein providing electrical power to the electric machine to drive the forward thrust propulsor with the electric machine comprises providing electrical power to the electric machine from the electric energy storage unit.

10. The method of claim 1, wherein the propulsion system further comprises an electric energy storage unit, and wherein rotating the electric machine with the turbomachine to generate electrical power comprises charging the electric energy storage unit with the electric power generated.

11. The method of claim 1, wherein the plurality of vertical thrust electric fans are fixed in position to provide thrust substantially along a vertical direction.

12. The method of claim 1, wherein the forward thrust propulsor is mounted to a fuselage of the aircraft at an aft end of the aircraft.

13. The method of claim 1, further comprising:
a sensor configured to detect the failure condition, wherein the failure condition of the turbomachine includes a shaft failure and a rotor failure of the turbomachine.

14. A hybrid-electric propulsion system for an aircraft comprising:
a power source comprising a combustion engine, an electric machine, and an electric energy storage unit, the electric energy storage unit electrically coupled to the electric machine;
a plurality of vertical thrust electric fans driven by the power source and configured to be integrated into a wing of the aircraft in an orientation to generate thrust along a vertical direction of the aircraft;
a forward thrust propulsor coupled to the combustion engine, wherein the combustion engine is positioned at an aft end of a fuselage of the aircraft and the forward thrust propulsor is mounted at least partially rearwardly of the combustion engine and at least one of the plurality of vertical thrust electric fans is mounted at least partially forward of the combustion engine; and
a controller having a memory and one or more processors, the memory storing instructions that when executed by the one or more processors cause the hybrid-electric propulsion system to perform functions, the functions including:
driving the forward thrust propulsor with the combustion engine;
rotating the electric machine with the combustion engine to generate electrical power;
determining a failure condition of the combustion engine; and
providing electrical power to the electric machine to drive the forward thrust propulsor with the electric machine in response to determining the failure condition of the combustion engine.

15. The propulsion system of claim 14, wherein the combustion engine is a turboshaft engine comprising an output shaft, wherein the forward thrust propulsor comprises a fan shaft, and wherein the output shaft is selectively or permanently mechanically coupled to the fan shaft.

16. The propulsion system of claim 14, wherein driving the forward thrust propulsor with the turbomachine comprises driving the forward thrust propulsor with the turbomachine through a mechanical connection.

17. The propulsion system of claim 16, wherein the propulsion system further comprises a coupling unit with the combustion engine selectively coupled to the electric machine through the coupling unit, and wherein the functions further comprise:
decoupling the turbomachine from the electric machine using the coupling unit in response to determining the failure condition of the turbomachine.

18. The propulsion system of claim 16, wherein the propulsion system further comprises a speed change mechanism with the combustion engine coupled to the electric machine through the speed change mechanism, and wherein the functions further comprise:
reducing an effective gear ratio between the turbomachine and the electric machine using the speed change mechanism in response to determining the failure condition of the turbomachine.

19. A hybrid-electric propulsion system for an aircraft comprising:
a power source comprising a combustion engine and an electric machine;
first and second vertical thrust electric fans driven by the power source to generate thrust along a vertical direction of the aircraft and both integrated into a common wing, wherein the second fan is positioned on an opposing side of the first fan from a fuselage of the aircraft and wherein the second fan is at least partially forward of the first fan;
a forward thrust propulsor coupled to the combustion engine; and
a controller having a memory and one or more processors, the memory storing instructions that when executed by the one or more processors cause the hybrid-electric propulsion system to perform functions, the functions including:
driving the forward thrust propulsor with the combustion engine;
rotating the electric machine with the combustion engine to generate electrical power;
determining a failure condition of the combustion engine; and
providing electrical power to the electric machine to drive the forward thrust propulsor with the electric machine in response to determining the failure condition of the combustion engine.

20. The hybrid-electric propulsion system for an aircraft of claim 19, wherein the turbomachine generates direct current electric power that is provided to at least one of an electric energy storage unit or the plurality of vertical thrust electric fans.

* * * * *